(12) United States Patent
Wright

(10) Patent No.: US 11,727,501 B2
(45) Date of Patent: Aug. 15, 2023

(54) CRYPTOGRAPHIC METHOD AND SYSTEM FOR SECURE EXTRACTION OF DATA FROM A BLOCKCHAIN

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 24 days.

(21) Appl. No.: 16/078,609

(22) PCT Filed: Feb. 21, 2017

(86) PCT No.: PCT/IB2017/050979
§ 371 (c)(1),
(2) Date: Aug. 21, 2018

(87) PCT Pub. No.: WO2017/145048
PCT Pub. Date: Aug. 31, 2017

(65) Prior Publication Data
US 2019/0066228 A1 Feb. 28, 2019

(30) Foreign Application Priority Data

Feb. 23, 2016 (GB) .................................... 1603117
Mar. 16, 2016 (GB) .................................... 1604497
Nov. 15, 2016 (GB) .................................... 1619301

(51) Int. Cl.
*G06Q 40/12* (2023.01)
*H04L 9/30* (2006.01)
(Continued)

(52) U.S. Cl.
CPC ......... *G06Q 40/12* (2013.12); *G06F 16/1834* (2019.01); *G06F 16/27* (2019.01);
(Continued)

(58) Field of Classification Search
CPC ................ G06Q 40/12; G06Q 10/10; G06Q 40/00–128; H04L 9/0844; H04L 9/0825;
(Continued)

(56) References Cited

U.S. PATENT DOCUMENTS 5,535,276 A 7/1996 Ganesan
5,600,725 A 2/1997 Rueppel et al.
(Continued)

FOREIGN PATENT DOCUMENTS

AU 2016100059 A4 3/2016
CA 2867765 A1 4/2016
(Continued)

OTHER PUBLICATIONS

"bips / bip-0032.mediawiki", available at <https://web.archive.org/web/20150811020640/https://github.com/bitcoin/bips/blob/master/bip-0032.mediawiki>, Github, Aug. 11, 2015, accessed Feb. 9, 2021, p. 1-4 (Year: 2015).*
(Continued)

*Primary Examiner* — John W Hayes
*Assistant Examiner* — Chenyuh Kuo
(74) *Attorney, Agent, or Firm* — Davis Wright Tremaine LLP

(57) ABSTRACT

The invention relates generally to cryptographic techniques for secure processing, transmission and exchange of data. It also relates to peer-to-peer distributed ledgers such as (but not limited to) the Bitcoin blockchain. In particular, it relates to control solutions for identifying, protecting, extracting, transmitting and updating data in a cryptographically controlled and secure manner. It also relates to system interoperability and the ability to communicate data between different and distinct computing systems. The invention provides a computer implemented method (and correspond- (Continued)

ing systems) comprising the steps of identifying a set of first structure public keys comprising at least one public root key associated with a first structure of interest of an entity and one or more associated public sub-keys; deriving a deterministic association between the at least one public root key and the one or more associated public sub-keys; and extracting data from a plurality of transactions (TXs) from a blockchain. The data comprises data indicative of a blockchain transaction (Tx) between the first structure and at least one further structure; and a first structure public key associated with the first structure. The first structure public key is part of a cryptographic public/private key. The method includes the step of generating an output for the first structure of interest by matching at least part of the set of first structure public keys to the extracted transaction data using the deterministic association. The one or more public sub-keys is generated or determined using Elliptic Curve Cryptography (ECC) and a deterministic key (DK) that is based on a cryptographic hash of a message (M). The one or more public sub-keys is determined based on a scalar addition of an associated public parent key and the scalar multiplication of a deterministic key (DK) and a generator (G).

12 Claims, 13 Drawing Sheets

(51) Int. Cl.
  *H04L 9/08* (2006.01)
  *G06F 16/27* (2019.01)
  *G06F 16/182* (2019.01)
  *H04L 9/00* (2022.01)
(52) U.S. Cl.
  CPC .......... *H04L 9/0825* (2013.01); *H04L 9/0838* (2013.01); *H04L 9/0844* (2013.01); *H04L 9/0861* (2013.01); *H04L 9/3066* (2013.01); *H04L 9/50* (2022.05); *H04L 2209/56* (2013.01)
(58) Field of Classification Search
  CPC ... H04L 9/0838; H04L 9/0861; H04L 9/3066; H04L 2209/38; H04L 2209/56; H04L 9/00–38; H04L 2209/00–88; G06F 16/27; G06F 16/1834; G06F 16/00–80
  See application file for complete search history.

(56) References Cited

U.S. PATENT DOCUMENTS

| | | | |
|---|---|---|---|
| 5,761,305 A | 6/1998 | Vanstone et al. | |
| 5,867,578 A | 2/1999 | Brickell et al. | |
| 5,889,865 A | 3/1999 | Vanstone et al. | |
| 5,896,455 A | 4/1999 | Vanstone et al. | |
| 5,920,630 A | 7/1999 | Wertheimer et al. | |
| 5,933,504 A | 8/1999 | Vanstone et al. | |
| 6,061,449 A | 5/2000 | Candelore et al. | |
| 6,078,667 A | 6/2000 | Johnson | |
| 6,118,874 A | 9/2000 | Okamoto et al. | |
| 6,122,736 A | 9/2000 | Vanstone et al. | |
| 6,141,420 A | 10/2000 | Vanstone et al. | |
| 6,286,098 B1 | 9/2001 | Wenig et al. | |
| 6,490,352 B1 | 12/2002 | Schroeppel | |
| 6,618,483 B1 | 9/2003 | Vanstone et al. | |
| 6,662,299 B1 | 12/2003 | Price, III | |
| 6,704,870 B2 | 3/2004 | Vanstone et al. | |
| 6,785,813 B1 | 8/2004 | Vanstone et al. | |
| 6,792,530 B1 | 9/2004 | Qu et al. | |
| 6,819,766 B1 | 11/2004 | Weidong | |
| 6,876,745 B1 | 4/2005 | Kurumatani | |
| 7,003,665 B1 | 2/2006 | Dultz et al. | |
| 7,006,633 B1 | 2/2006 | Reece | |
| 7,095,851 B1 | 8/2006 | Scheidt | |
| 7,912,747 B2* | 3/2011 | Sachedina | G06Q 30/0202 705/7.29 |
| 7,929,702 B2* | 4/2011 | Brown | H04L 9/0825 380/37 |
| 8,166,481 B2 | 4/2012 | Dadiomov et al. | |
| 8,401,185 B1 | 3/2013 | Telang | |
| 8,520,855 B1 | 8/2013 | Kohno et al. | |
| 8,522,011 B2 | 8/2013 | Spalka et al. | |
| 8,855,318 B1 | 10/2014 | Patnala et al. | |
| 9,209,980 B2 | 12/2015 | Bowman et al. | |
| 9,251,531 B2 | 2/2016 | Sarkissian | |
| 9,258,130 B2 | 2/2016 | Hwang et al. | |
| 9,298,806 B1 | 3/2016 | Vessenes et al. | |
| 9,350,549 B2 | 5/2016 | Lumb | |
| 9,436,923 B1* | 9/2016 | Sriram | H04L 9/0825 380/37 |
| 9,641,338 B2* | 5/2017 | Sriram | G06Q 30/0202 705/7.29 |
| 9,673,975 B1 | 6/2017 | Machani | |
| 10,050,779 B2 | 8/2018 | Alness et al. | |
| 10,068,228 B1 | 9/2018 | Winklevoss et al. | |
| 10,354,325 B1 | 7/2019 | Skala et al. | |
| 10,510,053 B2 | 12/2019 | Armstrong | |
| 10,516,527 B1 | 12/2019 | Machani et al. | |
| 10,659,223 B2 | 5/2020 | Wright et al. | |
| 10,719,816 B1 | 7/2020 | Kurani | |
| 11,115,196 B1 | 9/2021 | Triandopoulos et al. | |
| 2001/0050990 A1 | 12/2001 | Sudia | |
| 2002/0112171 A1 | 8/2002 | Ginter et al. | |
| 2002/0198791 A1 | 12/2002 | Perkowski | |
| 2003/0026432 A1 | 2/2003 | Woodward | |
| 2003/0046202 A1 | 3/2003 | Knapp | |
| 2003/0048906 A1 | 3/2003 | Vora et al. | |
| 2003/0081785 A1 | 5/2003 | Boneh et al. | |
| 2003/0188153 A1 | 10/2003 | Demoff et al. | |
| 2004/0030932 A1 | 2/2004 | Juels et al. | |
| 2004/0049687 A1 | 3/2004 | Orsini et al. | |
| 2004/0078775 A1 | 4/2004 | Chow et al. | |
| 2004/0111484 A1 | 6/2004 | Young et al. | |
| 2004/0190181 A1 | 9/2004 | Hikosaka et al. | |
| 2004/0193890 A1 | 9/2004 | Girault | |
| 2005/0071283 A1 | 3/2005 | Randle et al. | |
| 2005/0094806 A1 | 5/2005 | Jao et al. | |
| 2005/0138374 A1 | 6/2005 | Zheng et al. | |
| 2006/0023887 A1 | 2/2006 | Agrawal et al. | |
| 2006/0034494 A1 | 2/2006 | Holloran | |
| 2006/0153365 A1 | 7/2006 | Beeson | |
| 2006/0153368 A1 | 7/2006 | Beeson | |
| 2006/0156013 A1 | 7/2006 | Beeson | |
| 2006/0161485 A1 | 7/2006 | Meldahl | |
| 2006/0179319 A1 | 8/2006 | Krawczyk | |
| 2006/0248114 A1 | 11/2006 | Anderson et al. | |
| 2007/0055880 A1 | 3/2007 | Lauter et al. | |
| 2007/0165843 A1 | 7/2007 | Lauter et al. | |
| 2007/0192842 A1 | 8/2007 | Beaulieu et al. | |
| 2007/0223706 A1 | 9/2007 | Gantman et al. | |
| 2007/0265978 A1 | 11/2007 | Kahn et al. | |
| 2007/0269040 A1 | 11/2007 | Yuval et al. | |
| 2007/0276836 A1 | 11/2007 | Chatterjee et al. | |
| 2008/0082817 A1 | 4/2008 | Takahashi et al. | |
| 2008/0101596 A1 | 5/2008 | Cerruti et al. | |
| 2008/0137857 A1 | 6/2008 | Bellare et al. | |
| 2008/0144836 A1 | 6/2008 | Sanders et al. | |
| 2008/0263357 A1 | 10/2008 | Boyen | |
| 2008/0285759 A1 | 11/2008 | Shaw | |
| 2008/0288773 A1 | 11/2008 | Nguyen et al. | |
| 2009/0022311 A1 | 1/2009 | Vanstone et al. | |
| 2009/0048979 A1 | 2/2009 | Al-Herz et al. | |
| 2009/0074179 A1 | 3/2009 | Futa et al. | |
| 2009/0161876 A1 | 6/2009 | Sherkin | |
| 2009/0282243 A1 | 11/2009 | Rose et al. | |
| 2010/0005302 A1 | 1/2010 | Vishnu et al. | |
| 2010/0023771 A1 | 1/2010 | Struik | |
| 2010/0031369 A1 | 2/2010 | Grummt | |
| 2010/0037055 A1 | 2/2010 | Fazio et al. | |

(56) References Cited

U.S. PATENT DOCUMENTS

| | | |
|---|---|---|
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2011/0016510 A1 | 1/2011 | Matsuda et al. |
| 2011/0022854 A1 | 1/2011 | Macchetti et al. |
| 2011/0202773 A1 | 8/2011 | Ghouti et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0318578 A1 | 11/2013 | Palagummi |
| 2014/0012751 A1 | 1/2014 | Kuhn et al. |
| 2014/0068246 A1 | 3/2014 | Hartley et al. |
| 2014/0082358 A1 | 3/2014 | Nakhjir et al. |
| 2014/0108473 A1 | 4/2014 | Nowoczynski et al. |
| 2014/0129844 A1 | 5/2014 | Johnson et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0095648 A1 | 4/2015 | Nix |
| 2015/0120567 A1 | 4/2015 | Van Rooyen et al. |
| 2015/0154562 A1 | 6/2015 | Emmerson |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0256347 A1 | 9/2015 | Tseng et al. |
| 2015/0262139 A1 | 9/2015 | Shtyiman |
| 2015/0262140 A1 | 9/2015 | Armstrong |
| 2015/0269570 A1 | 9/2015 | Phan et al. |
| 2015/0294425 A1 | 10/2015 | Benson |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0027229 A1 | 1/2016 | Spanos et al. |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1* | 9/2016 | Sriram .................. H04L 9/3242 |
| 2016/0275294 A1 | 9/2016 | Irvine |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1* | 11/2016 | McCoy .................. G06Q 50/01 |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |
| 2017/0061138 A1 | 3/2017 | Lambert |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0103385 A1 | 4/2017 | Wilson, Jr. et al. |
| 2017/0109735 A1* | 4/2017 | Sheng .................. H04L 9/3297 |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1* | 10/2017 | Mann .................. H04L 9/3239 |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'er et al. |
| 2018/0109377 A1 | 4/2018 | Fu |

(56) References Cited

U.S. PATENT DOCUMENTS

| | | | |
|---|---|---|---|
| 2018/0123780 A1 | 5/2018 | Ikarashi | |
| 2018/0146367 A1 | 5/2018 | Altin et al. | |
| 2018/0176017 A1 | 6/2018 | Rodriguez et al. | |
| 2018/0176222 A1 | 6/2018 | Bhaskar et al. | |
| 2018/0225431 A1 | 8/2018 | Ikarashi et al. | |
| 2018/0240107 A1 | 8/2018 | Andrade | |
| 2018/0247191 A1 | 8/2018 | Katz et al. | |
| 2018/0341648 A1 | 11/2018 | Kakavand et al. | |
| 2018/0349572 A1 | 12/2018 | Chen et al. | |
| 2018/0367298 A1 | 12/2018 | Wright et al. | |
| 2018/0376318 A1 | 12/2018 | Wang et al. | |
| 2019/0014094 A1 | 1/2019 | Le Saint | |
| 2019/0034936 A1 | 1/2019 | Nolan et al. | |
| 2019/0080321 A1 | 3/2019 | Mundis et al. | |
| 2019/0080404 A1 | 3/2019 | Molinari et al. | |
| 2019/0080406 A1 | 3/2019 | Molinari et al. | |
| 2019/0130368 A1 | 5/2019 | Li et al. | |
| 2019/0149337 A1 | 5/2019 | Savanah et al. | |
| 2019/0158470 A1 | 5/2019 | Wright et al. | |
| 2019/0188793 A1 | 6/2019 | Molinari et al. | |
| 2019/0199531 A1 | 6/2019 | Staples et al. | |
| 2019/0220859 A1 | 7/2019 | Weight et al. | |
| 2019/0229911 A1 | 7/2019 | Allen | |
| 2019/0238334 A1 | 8/2019 | Nakamura | |
| 2019/0340352 A1 | 11/2019 | Peeters et al. | |
| 2019/0349733 A1 | 11/2019 | Nolan et al. | |
| 2019/0378139 A1* | 12/2019 | Stribady | H04L 9/3239 |
| 2019/0392118 A1 | 12/2019 | Elden et al. | |
| 2019/0392536 A1 | 12/2019 | Rice | |
| 2020/0026785 A1 | 1/2020 | Patangia et al. | |
| 2020/0285935 A1 | 9/2020 | Song et al. | |
| 2021/0056070 A1 | 2/2021 | Kakavand et al. | |
| 2021/0194677 A1 | 6/2021 | Pourzandi et al. | |

FOREIGN PATENT DOCUMENTS

| | | |
|---|---|---|
| CN | 101447980 A | 6/2009 |
| CN | 102144371 A | 8/2011 |
| CN | 103440209 A | 12/2013 |
| CN | 103927656 A | 7/2014 |
| CN | 104320262 A | 1/2015 |
| CN | 105204802 A | 12/2015 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |
| JP | 2008146601 A | 6/2008 |
| JP | 2009105824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012-515393 A | 7/2012 |
| JP | 2014068140 A | 4/2014 |
| JP | 2015536617 A | 12/2015 |
| JP | 5858506 B1 | 2/2016 |
| JP | 2019512909 A | 5/2019 |
| KR | 20110012085 A | 2/2011 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016161073 A1 | 10/2016 |
| WO | 2017112664 A1 | 6/2017 |

OTHER PUBLICATIONS

"bips/bip-0032.mediawiki", available at <https://web.archive.org/web/20150811020640/https://github.com/bitcoin/bips/blobk/master/bip-0032.mediawiki>, Github, Aug. 11, 2015, accessed Feb. 9, 2021, p. 1-4 (Year: 2015) (Year: 2015).*

Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.

Tuesta et al., "Smart contracts: the ultimate automation of trust?," BBVA Research Financial Inclusion Unit, Oct. 2015, 5 pages.

UK Commercial Search Report dated Apr. 25, 2016, Patent Application No. 11603117.1, filed Feb. 23, 2016, 11 pages.

UK Commercial Search Report dated Feb. 17, 2017, Patent Application No. 1604493.5, 8 pages.

UK Commercial Search Report dated Jan. 13, 2017, Patent Application No. 1604498.4, 8 pages.

UK Commercial Search Report dated Jun. 14, 2016, Patent Application No. 1607249.8, 4 pages.

UK Commercial Search Report dated Jun. 27, 2016, Patent Application No. GB 1603123.9, filed Feb. 23, 2016, 11 pages.

UK Commercial Search Report dated Jun. 27, 2016, Patent Application No. GB 1603125.4, filed Feb. 23, 2016, 11 pages.

UK Commercial Search Report dated Jun. 28, 2016, Patent Application No. GB 1603122.1, filed Feb. 23, 2016, 12 pages.

UK Commercial Search Report dated Jun. 6, 2016, Patent Application No. 1604497.6, filed Mar. 16, 2016, 6 pages.

UK Commercial Search Report dated Jun. 9, 2016, Patent Application No. GB1603117.1, filed Feb. 23, 2016, 12 pages.

UK Commercial Search Report dated May 20, 2016, Patent Application No. 1605026.2, 4 pages.

UK Commercial Search Report dated May 24, 2016, Patent Application No. GB1605571.7, filed Apr. 1, 2016, 3 pages.

UK Commercial Search Report dated May 9, 2016, Patent Application No. GB1603114.8, filed Feb. 23, 2016, 2 pages.

UK Commercial Search Report dated Nov. 30, 2016, Patent Application No. 1607058.3, filed Apr. 22, 2016, 7 pages.

UK Commercial Search Report dated Sep. 30, 2016, Patent Application No. 1606630.0, filed Apr. 15, 2016, 7 pages.

UK Expanded Commercial Search Report dated Jun. 15, 2016, Patent Application No. 1605026.2, 5 pages.

UK IPO Search Report dated Dec. 12, 2016, Patent Application No. GB1606630.0, filed Apr. 15, 2016, 4 pages.

UK IPO Search Report dated Dec. 21, 2016, Patent Application No. GB1607058.3, filed Apr. 22, 2016, 3 pages.

UK IPO Search Report dated Dec. 28, 2016, Patent Application No. GB1604497.6, filed Mar. 16, 2016, 4 pages.

UK IPO Search Report dated Dec. 5, 2016, Patent Application No. 1607249.8, 4 pages.

UK IPO Search Report dated Dec. 6, 2016, Patent Application No. 1604493.5, 6 pages.

(56) References Cited

OTHER PUBLICATIONS

UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], 10 pages.
Whitequark, "#bitcoin-wizards on Jul. 30, 2015—ire logs atwhitequark.org," whitequark.org, https://irclog.whitequark.org/bitcoin-wizards/2015-07-30, Jul. 30, 2015 [retrieved Dec. 12, 2018], 8 pages.
Wikipedia, "Counterparty (platform)," last edited Dec. 6, 2019 [retrieved Jan. 13, 2020], 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willett et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
International Search Report and Written Opinion dated Apr. 12, 2017, Patent Application No. PCT/IB2017/050829, 9 pages.
International Search Report and Written Opinion dated Apr. 12, 2017, Patent Application No. PCT/IB2017/050866, 10 pages.
International Search Report and Written Opinion dated Apr. 26, 2017, International Patent Application No. PCT/B2017/050865, filed Feb. 16, 2017, 9 pages.
International Search Report and Written Opinion dated Apr. 3, 2017, Patent Application No. PCT/IB2017/050824, filed Feb. 14, 2017, 13 pages.
International Search Report and Written Opinion dated Apr. 3, 2017, Patent Application No. PCT/IB2017/050827, 10 pages.
International Search Report and Written Opinion dated Mar. 30, 2017, Patent Application No. PCT/IB2017/050825, 9 pages.
International Search Report and Written Opinion dated May 29, 2017, International Patent Application No. PCT/B2017/050815, filed Feb. 14, 2017, 10 pages.
International Search Report and Written Opinion dated May 31, 2017, Patent Application No. PCT/IB2017/050856, filed Feb. 16, 2017, 11 pages.
International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
International Search Report and Written Opinion dated May 31, 2017, Patent Application No. PCT/IB2017/050980, 12 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Killerstorm et al., "Transcript for #bitcoin-dev Sep. 3, 2012," BitcoinStats, http://www.bitcoinstats.com/irc/bitcoin-Jev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78 (1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellensi Ein, "The Counterparty Protocol," GitHub, https://github.com/jsimnz/Counterparty/blob/master/README.md, Jan. 8, 2014 [Dec. 12, 2018], 4 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.

(56) References Cited

OTHER PUBLICATIONS

McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk org/index.php?topic=456563.0, 7 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Openchain, "Home Page," openchain.org, Dec. 22, 2015 [retrieved May 8, 2020], https://web.archive.org/web/20151222083734/https://www.openchain.org/, 18 pages.
Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
Openssl Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Reddit, "Could Microsoft use the blockchain as a license key for it's software?," r/Bitcoin, Sep. 7, 2015 [retrieved May 8, 2020], https://www.reddit.eom/r/Bitcoin/comments/3jz09c/could_microsoft_use_the_blockchain_as_a_license/?st=iw26pndq&sh=b862bf/d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sanchez,"Marketplaces," GitHub, Jun. 10, 2015 [retrieved May 12, 2020], https://github.com/drwasho/openbazaar-documentation/blob/master/04%20Marketplaces.md, 37 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action dated Jul. 28, 2020, Patent Application No. 106105709, 9 pages.
Taiwanese Office Action dated Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 dated Jun. 12, 2019, U.S. Appl. No. 16/078,605, filed Aug. 21, 2018, 31 pages.
Third-Party Submission Under 37 CFR 1.290 dated Jun. 12, 2019, U.S. Appl. No. 16/079,089, filed Aug. 22, 2018, 19 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay Op_Return data TxOut as standard transaction type #2738," Github, Jun. 4, 2013, https://github.com/bitcoin/bitcoin/pull/2738, 12 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www coinffeine.com/, 2 pages.
Antonopoulos, "Mastering Bitcoin—Unlocking Digital Cryptocurrencies," O'Reilly Media, Inc., Dec. 20, 2014, 282 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak et al, "Understanding Stealth Addresses/Payments," Bitcoin Forum, Jun. 10, 2015 (retrieved Jun. 16, 2020), https://bitcointalk.org/index.php?topic=1086498.0, 8 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

(56) References Cited

OTHER PUBLICATIONS

Christidis et al., "Blockchains and Smart Contracts for the Internet of Things," IEEE Access 4(1):2292-2303, May 10, 2016.
Coinprism, "80 bytes Op_Return explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative CHECKLOCKTIMEVERIFY (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode,"New Kid on the Blockchain," Hacker News, https://news.ycombinator.com/item?id=11372455, Mar. 28, 2016 [Dec. 12, 2018], 32 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions". . . but only w/ a malleability-fixing soft fork," Reddit r/bitcoin, https://www.reddit.eom/r/Bitcoin/comments/2z2l91/time_to_lobby_bitcoins_core_devs_sf_bitcoin_devs/, Mar. 14, 2015 [Dec. 12, 2018], 21 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/ogs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Friedenbach, "[Bitcoin-development] New Output Script Type," Linux Foundation, Sep. 14, 2013, https://lists.inuxfoundation.org/pipermail/bitcoin-dev/2013-September/003256.html, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1 .pdf, 16 pages.
Anonymous, "Bitcoin Stats," retrieved from http://bitcoinstats.com/irc/bitcoin-dev/logs/2015/03/27, Mar. 27, 2015, 11 pages.
Australian Office Action for Application No. 2017223158, dated Jun. 22, 2021, 7 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Countyparty, "The Counterparty Protocol," retrieved from https://github.com/jsimnz/Counterparty/blob/master/README.md, Jan. 8, 2014, 6 pages.
Ethereum, "EIP-20: Token Standard," retrieved from https://eips.ethereum.org/EIPS/eip-20, Nov. 19, 2015, 5 pages.
Fotiou et al., "Decentralized Name-based Security for Content Distribution using Blockchains," retrieved from, Mobile Multimedia Laboratory, Department of Informatics, Apr. 14, 2016, 6 pages.
Fujimura et al., "BRIGHT: A Concept for a Decentralized Rights Management System Based on Blockchain," 2015 IEEE 5th International Conference on Consumer Electronics-Berlin (ICCE-Berlin), Sep. 6, 2015, 2 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.
Hacker News, "Cryptocontracts Will Turn Contract Law into a Programming Language," retrieved from https://news.ycombinator.com/item?id=7287155, Feb. 23, 2014, 12 pages.
International Search Report and Written Opinion dated Apr. 12, 2017, Patent Application No. PCT/IB2017/050818, 10 pages.
International Search Report and Written Opinion dated Apr. 21, 2017, Patent Application No. PCT/IB2017/050820, 12 pages.

(56) References Cited

OTHER PUBLICATIONS

International Search Report and Written Opinion dated Mar. 30, 2017, Patent Application No. PCT/IB2017/050819, 13 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Lebeau, "An Ethereum Journey to Decentralize All Things," retrieved from https://medium.com/@SingularDTV/an-ethereum-journey-to-decentralize-all-things-8d62b02e232b#.r6n9w8kqh, Jul. 11, 2016, 10 pages.
Luu et al., "Demystifying Incentives in the Consensus Computer," ISBN, Oct. 2015, 14 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Noizat et al., "Blockchain Electronic Vote," retrieved from https://www.weusecoins.com/assets/pdf/library/blockchain-electronic-vote.pdf, Apr. 29, 2015, 9 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Rockwell, "BitCongress—Process For Blockchain Voting & Law," retrieved from http://generalbitcoin.com/BitCongress_Whitepaper.pdf, Feb. 12, 2016, 8 pages.
Satoshi et al., "Connection Limits," Bitcoin Forum, Aug. 9, 2010, https://bitcointalk.org/index.php?topic=741.0; prev_next=prev, 2 pages.
Swan, "Blockchain: Blueprint for a New Economy," O'Reilly, Feb. 2015, 149 pages.
UK Commercial Search Report dated Jun. 27, 2016, Patent Application No. GB 1603125.4, 11 pages.
UK Commercial Search Report dated May 16, 2016, Patent Application No. GB1603125.4, 8 pages.
UK Commercial Search Report dated May 9, 2016, Patent Application No. GB1603112.2, 6 pages.
UK Commercial Search Report dated Oct. 10, 2016, Patent Application No. GB1607484.1, filed Apr. 29, 2016, 5 pages.
UK IPO Search Report dated Jul. 4, 2016, Patent Application No. GB1603125.4, 6 pages.
UK IPO Search Report dated Oct. 21, 2016, Patent Application No. GB1603112.2, 4 pages.
White, "How Computers Work," Que Publishing 7th Edition, Oct. 15, 2003, 44 pages.
Antonopoulos et al., "Bitcoin Book," GitHub, retrieved from https://github.com/bitcoinbook/bitcoinbook, Jun. 8, 2017, 4 pages.
Nxt, "Voting," nxt.org, website archived on Feb. 18, 2016 [retrieved May 31, 2022], https://web.archive.org/web/20160218021746/https://nxt.org/what-is-nxt/voting/, 3 pages.
UK IPO Search Report dated Dec. 21, 2016, Patent Application No. GB1607058.3, 3 pages.
International Search Report and Written Opinion dated Apr. 3, 2017, Patent Application No. PCT/IB2017/050827, 13 pages.
crpit.com, FYJC Mumbai 11th Online Admission 2021—Part—1, 2 Admission Form (mumbai.11thadmission.org.in), https://crpit.com, Jul. 6, 2021 8 pages.
Franco, "Understanding Bitcoin: Cryptography, Engineering and Economics," Wiley, ISBN: 978-1-119-01916-9, Oct. 2014, 144 pages.
Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.
UK IPO Search Report dated Dec. 23, 2016, Patent Application No. GB1604495.0, 5 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.

UK Commercial Search Report dated Jun. 9, 2016, Patent Application No. GB1603114.8, 4 pages.
International Search Report and Written Opinion dated Mar. 29, 2017, Patent Application No. PCT/IB2017/050821, 13 pages.
Bitcoin Forum, "Counterparty—Pioneering Peer-to-Peer Finance", https://bitcointalk.org/index.php?topic=395761.0 Feb. 1, 2014, 7 pages.
Buterin, "Introducing Ethereum Script 2.0", Ethereum Foundation Blog, Feb. 3, 2014, 9 pages.
Brown, "On Distributed Satabases and Distributed Ledgers", Thoughts on the Future of Finance, Nov. 8, 2016, https://gendal.me/page/3/, 44 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion dated Aug. 3, 2018, Patent Application No. PCT/IB2018/053289, 10 pages.
UK Commercial Search Report dated Jun. 12, 2017, Patent Application No. GB510912, 6 pages.
UK IPO Search Report dated Oct. 9, 2017, Patent Application No. GB1707788.4, 6 pages.
Drwasho, "Openbazaar Documentation", Github, Jun. 2015, 53 pages.
Bluematt, "Contract", Bitcoin Wiki, Oct. 22, 2015, 12 pages.
UK IPO Search Report dated Dec. 21, 2016, Patent Application No. GB1607484.1, 4 pages.
Akutsu et al., "Taking on the challenge of creating epoch-making services that impress users. For services that can share the excitement of competitions around the world," NTT Technical Journal 27(5):10-14, May 1, 2015.
bitcoininvestor.com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.
Block_Chan, "Tweet dated Nov. 7, 2018," Twitter, Nov. 7, 2018, https://twitter.com/block_chan/status/1060336404163584000, 1 page.
Bradbury, "Developers Battle Over Bitcoin Block Chain," Coindesk, http://www.coindesk.com/developers-battle-bitcoin-block-chain/, Mar. 25, 2014, 3 pages.
Durback, "Standard BIP Draft Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Fuchita, "Special Topic: Innovation and Finance, Blockchain and Financial Transaction Innovation," Nomura Capital Market Quarterly 19-2(74):11-35, Nov. 1, 2015.
Hearn, "Distributed markets," Bitcoin Wiki, https://en.bitcoin.it/wiki/Distributed_markets, Jul. 11, 2015 [retrieved Sep. 20, 2016], 5 pages.
International Search Report and Written Opinion dated Apr. 10, 2017, Patent Application No. PCT/IB2017/050861, 11 pages.
International Search Report and Written Opinion dated Mar. 29, 2017, Patent Application No. PCT/IB2017/050821, 10 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Oct. 8, 2019, Patent Application No. 2018-539895, 9 pages.
Kens et al., "Cryptocontracts Will Turn Contract Law Into a Programming Language ," Hacker News, Feb. 23, 2014, https://news.ycombinator.com/item?id=7287155, 12 pages.
Minsky et al., "Computation: Finite and Infinite Machines Chapter 14: Very Simple Bases for Computability," Prentice Hall, Inc, 1967, 29 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.

(56) References Cited

OTHER PUBLICATIONS

Noizat, "Handbook of Digital Currency Chapter 22: Blockchain Electronic Vote," Elsevier Inc., David Lee Kuo Chuen (ed.), May 2015, 9 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https:/lgist.github.com/drwasho/a5380544c170bdbbbad8, Jan. 2016, 12 pages.
Taiwanese Office Action dated Apr. 12, 2021, Patent Application No. 109142412, 5 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
UK Commercial Search Report dated Nov. 14, 2016, Patent Application No. GB1607063.3, 8 pages.
JK IPO Search Report dated Dec. 15, 2016, Patent Application No. GB1607063.3, 6 pages.
Yaokai et al., "Experimental evaluation of the next-generation cryptocunrency platform Ethereum," CSS2015 Computer Security Symposium 2015 Proceedings 2015(3):1151-1158, Oct. 14, 2015.

\* cited by examiner

CRYPTOGRAPHIC METHOD AND SYSTEM FOR SECURE EXTRACTION OF DATA FROM A BLOCKCHAIN

TECHNICAL FIELD

The present disclosure relates generally to cryptographic techniques for secure processing, transmission and exchange of data. It also relates to peer-to-peer distributed ledgers such as (but not limited to) the Bitcoin blockchain and associated technologies. In particular, it relates to control solutions for identifying, protecting, extracting, transmitting and updating data in a cryptographically controlled and secure manner. It also relates to system inter-operability and the ability to communicate data between different and distinct computing systems.

BACKGROUND

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

In the present disclosure, these techniques are used in a novel and advantageous arrangement which allows data and assets to be transferred between different computer systems, one of which is a blockchain. The computer systems used within large organisations or entities can often be extremely large, complex and technically diverse. Security of the data is typically paramount. Access to, and utilisation of, the data stored in the systems needs to be efficient and cost effective. There is a need to overcome at least some of the technical difficulties which arise from the use of complex computing systems within large organisations, which are often hierarchical in nature.

In this document we use a financial accounting context to illustrate one possible use or application of the invention. However, it is important to note that this example is for illustrative purposes only and the invention is not limited in this regard. Instead, the invention provides a generalised, cryptographically enforced, blockchain-based solution for use with any type of non-blockchain implemented computing system associated with an organisation.

In relation to our illustrative use, a general ledger of an entity is a set of accounts that summarises all financial transactions occurring within an entity. The structure of this set of accounts is typically set up by the individual entity itself, and may include accounts reported on a business financial statement, such as cash, accounts payable, expense accounts as well as purchases and loans. In some situations, a general ledger may be subdivided into multiple sub-ledgers. In such a case, each sub-ledger within the general ledger may maintain a separate balance or a running balance of the financial position based on a monetary exchange for each account which the entity needs to track.

The accounting setup for entities can get relatively complex with hundreds or thousands of separate reporting points, i.e. business units, departments, products etc. For example, parallel books may be required: one by product line and one by department.

Large entities may implement complex financial systems based on large database structures to manage the accounts for the general ledger. For example, a financial system may require the management and synchronisation of various databases so that the captured data can be accurately reported.

In this document we use the term 'blockchain' to include all forms of electronic, computer-based, distributed ledgers. These include, but are not limited to, peer-to-peer, consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

SUMMARY

The present invention is defined in the appended claims.

The invention may provide a cryptographic method and corresponding system. It may provide a blockchain-implemented method/system. It may provide a control system for the secure identification, extraction, transmission, processing and/or update of data. It may provide a method/system of using cryptographic keys to integrate a blockchain with a non-blockchain implemented computing (e.g. data storage/processing) resource. It may provide a method/system of using cryptographic keys to extract data from a blockchain and/or integrate that blockchain-sourced data into a non-blockchain implemented storage resource. The invention may provide a computer implemented method of generating records for a (first) structure of interest of an entity on or from a peer-to-peer distributed ledger (i.e. blockchain). The entity may be referred to as an organisation, system or network.

The invention provides significant advantages over the prior art, not least because it allows the secure handling of data, the integrity of which is preserved through the use of novel cryptographic techniques. It also enables communication and exchange of data between separate computer systems which have been implemented upon different designs, structures, architectures and protocols. Thus, it provides system interoperability. It allows the use of cryptographic keys to serve as a facilitator or interface between an existing computer system and a blockchain, without the need for any adaptation of the protocols or structure of either. It provides enhanced performance and efficiency of data processing because it facilitates the management and synchronisation of potentially numerous and complex systems e.g. databases.

An entity may be made up of a plurality of elements e.g. system components, accounts, data records or network entities, etc. The entity may be a hierarchical entity having comprising a plurality of elements organised or associated in a hierarchical relationship. The elements within an entity may form a structure of elements. It may be a hierarchical structure. The structure may comprise a chain or tree-like hierarchy defining or being reflective of the relationships or associations between the elements in the entity. The elements in a structure may be associated with a sub-entity, unit or other association within the entity.

The entity and/or one or more elements within the structure may be associated with a respective cryptographic key. The key may form part of a public/private key pair. There may be one key or key pair which is designated as the "root" key/pair. Further elements in the structure may be associated with sub-keys or pairs which are derived from the root. The sub-keys may be generated in a deterministic manner. The sub-key may be generated or determined substantially as described within the section below entitled "method of sub-key generation". A sub-key may be generated, derived or determined based on another (preceding) key. Generation of the sub-key may comprise the use of ECC techniques. A sub-key may be generated, derived or determined using a deterministic key (DK) that is based on a cryptographic hash of a message (M). The message may be random, pseudo-random, pre-defined or selected. In a preferred embodiment, the message is selected, arranged or created to correspond to a meaningful value such as, for example, an account number. The message may have some meaning in relation to the entity or a sub-entity/element. The message may provide a link, association or reference to the entity or element. A sub-key may be determined based on a scalar addition of the associated public parent key and the scalar multiplication of the deterministic key and a generator (G). The message may be stored within or as metadata in a blockchain transaction (Tx). The message may be rehashed in order to provide a further sub-key.

The invention may comprise the steps of:

associating one or more elements of a structure with a cryptographic sub-key derived from another cryptographic key;

Extracting, from a blockchain transaction (Tx), data comprising or relating to a sub-key of an element; and transmitting the extracted data to a non-blockchain based computer system. The non-blockchain based computer system may not be part of the blockchain.

The method may comprise the step of scanning, traversing and/or analysing the blockchain to identify one or more blockchain transactions (TXs) which comprise the data relating to or comprising a cryptographic sub-key of an element.

The method may further comprise the steps of processing the extracted data to generate an output. In one embodiment, the output may be a result or a computation, or a report, or a decision, or a record such as a financial accounting record. It may comprise the step of communicating the output to a destination over a network.

Additionally or alternatively, the invention may comprise the steps:

identifying a set of first structure public keys comprising at least one public root key associated with the first structure and one or more associated public sub-keys;

deriving a deterministic association between the at least one public root key and the one or more associated public sub-keys;

extracting (copying) transaction data/information from a plurality of blockchain transactions from a peer-to-peer (P2P) distributed ledger (blockchain), the extracted data comprising at least:

data indicative of a transaction between the first structure and at least one further structure; and a first structure public key associated with the first structure wherein the first structure public key is part of a cryptography pair comprising the first structure public key and a first structure private key; and generating an output (e.g. financial accounting record) for the first structure of interest by matching the set of first structure public keys to the extracted transaction data using the deterministic association.

The transaction between the first structure and at least one further structure may involve the transfer an asset from one party to another. The asset may be a tokenised asset, or some sort of digital asset. It may be a portion of cryptocurrency. The transaction may transfer ownership and/or control of the asset from one party to another.

The blockchain may be associated with a cryptocurrency. For example, the blockchain may be the Bitcoin block chain. Alternatively, another cryptocurrency or block chain protocol may be used.

The first structure may represent a defined group of items, e.g. components within the entity. The items could be physical or logical e.g. accounts. For example, the first structure may be associated with a first business unit, such as a first group of users, a department or a team; a first product or service of the entity; or the complete entity.

The at least one further structure may be within the entity. For example, the at least one further structure may be associated with a second business unit, or a second product or service.

Alternatively, the at least one further structure may be within a further entity. For example, the at least one further structure may be associated with a business unit of a further entity, a product or service of the further entity, or the complete further entity.

The set of first structure public keys may comprise the at least one public root key and all associated public sub-keys.

The step of deriving the deterministic association between the at least one public root key and the one or more associated public sub-keys may comprise determining a rule for determining the public sub-keys from an associated parent key. For example, the rule to determine a sub-key may comprise determining a hash of a message to create a seed value.

The deterministic association between the at least one public root key and the one or more associated public sub-keys may be a tree hierarchy. Alternatively, the deterministic association may be a chain hierarchy.

Each public sub-key may represent a virtual or physical or logical item (e.g. an account) within the entity.

The step of identifying the set of first structure public keys may comprise identifying the at least one root key and determining the one or more sub-keys based on the at least one root key. The at least one root key may be identified by obtaining data from an internal database, such as for example a chart of accounts.

The step of extracting the transaction data from the plurality of transactions from the blockchain may further comprise extracting or copying one or more of the following data items from the plurality of transactions:
 a transaction input value;
 a transaction output value;
 a rule for deriving the transaction input or output value based on the data indicative of the transaction;
 a time stamp for the transaction; and
 a block number of a block of the blockchain.

The transaction between the first structure and a further structure may relate to a currency transaction, an exchange of a contract, a goods or services transaction or the like. With regard to the currency transaction, it will be appreciated that the transaction may relate to a cryptocurrency transaction such as Bitcoin, or a fiat currency transaction for example by using a token amount of cryptocurrency.

The step of extracting the transaction information from the plurality of transaction records from the P2P distributed ledger may comprise identifying transaction records that have not been previously extracted to generate financial accounting records. In one example, the method may comprise a step of identifying a block number of a block of the P2P distributed ledger and comparing the block number with financial accounting records generated previously.

The method may comprise a step of posting the output to a computer-based resource. This may be any type of computer-based system, such as a database system, or financial accounting ledger for example. It may be internal to the entity in that it may be arranged and configured for storage of data relating to the entity and/or its sub-entities. The computer-based resource may be a general ledger of the entity. Alternatively, the financial accounting ledger may be a sub-ledger of a general ledger of the entity. As mentioned above, a general ledger of an entity typically represents a set of accounts that summarises all financial transactions occurring within the entity.

The step of posting the generated output to the computer-based resource may be conducted automatically. In other words, it may be an automated, computer-executed process, without the need for manual intervention.

The step of posting the generated output may be conducted on a periodic basis. This may be after a pre-determined period of time or at a prescribed time.

The step of posting the generated output may comprise writing the generated output to one or more locations or files. These may be referred to as, for example, posting files The one or more posting files may have any suitable format, such as JSON, XML or XBRL. The one or more posting files may be encrypted. For example, the one or more posting files may be hashed. In a further example, the one or more posting files may be encrypted using a calculated secret. An example for calculating a secret is described in further detail in the section below entitled "Method for Sub-key Generation".

The method may comprise a step of signing the one or more posting files using a first structure private key, wherein the first structure private key is part of an asymmetric cryptography pair comprising the first structure private key and an associated first structure public key. In this way, the one or more posting files can be validated using the first structure public key that is associated with the first structure private key used to sign the one or more posting files.

The method may comprise a step of storing the generated output. In one particular example, the generated output may be recorded on an internal database or other storage facility of or within the entity. In an alternative example, the generated output may be stored on a public database that may be centralised or distributed, such as a distributed hash table. In a specific example, the generated output may be stored on blockchain in the form of a transaction (Tx). For example, the generated output may be recorded as metadata of (within) a blockchain transaction (Tx). A hash value of the transaction may be signed using a private key of the first structure of interest.

The method may comprise a step of encrypting the generated output for storing the data at a database or blockchain.

The method may comprise a step of hashing and/or signing the generated output for storing the generated output on a database, storage facility or blockchain.

The method may comprise a step of analysing the generated output. In one example, the method may comprise a step of determining a cash flow of the first structure of interest. In a further example, the method may comprise a step of determining assets and/or debts for the first structure of interest.

The step of posting the generated financial accounting records may comprise making the generated financial accounting records available to a dedicated accounting system. The accounting system may be configured to execute dedicated accounting software for the entity.

In accordance with embodiments of the present disclosure, there is provided a computer system arranged to implement any embodiment of a method of the invention. It may be arranged for generating records for a first structure of interest of an entity on a blockchain comprising:
 a processing device configured to
 identify a set of first structure public keys comprising at least one public root key associated with the first structure and one or more associated public sub-keys; and
 derive a deterministic association between the at least one public root key and the one or more associated public sub-keys;

a network interface configured to extract transaction information from a plurality of transaction records from a peer-to-peer (P2P) distributed ledger, the extracted information at least:

information indicative of a transaction between the first structure and at least one further structure; and a first structure public key associated with the first structure wherein the first structure public key is part of a cryptography pair comprising the first structure public key and a first structure private key; and wherein the processing device is further configured to generate financial accounting records for the first structure of interest by matching the set of first structure public keys to the extracted transaction information using the deterministic association.

A computer program comprising machine-readable instructions to cause a processing device to implement any one of the method described above.

BRIEF DESCRIPTION OF DRAWINGS

Embodiments of the present disclosure will now be described, by non-limiting example only, with reference to the accompanying drawings, in which.

DESCRIPTION OF EMBODIMENTS

Overview

Figure 1:
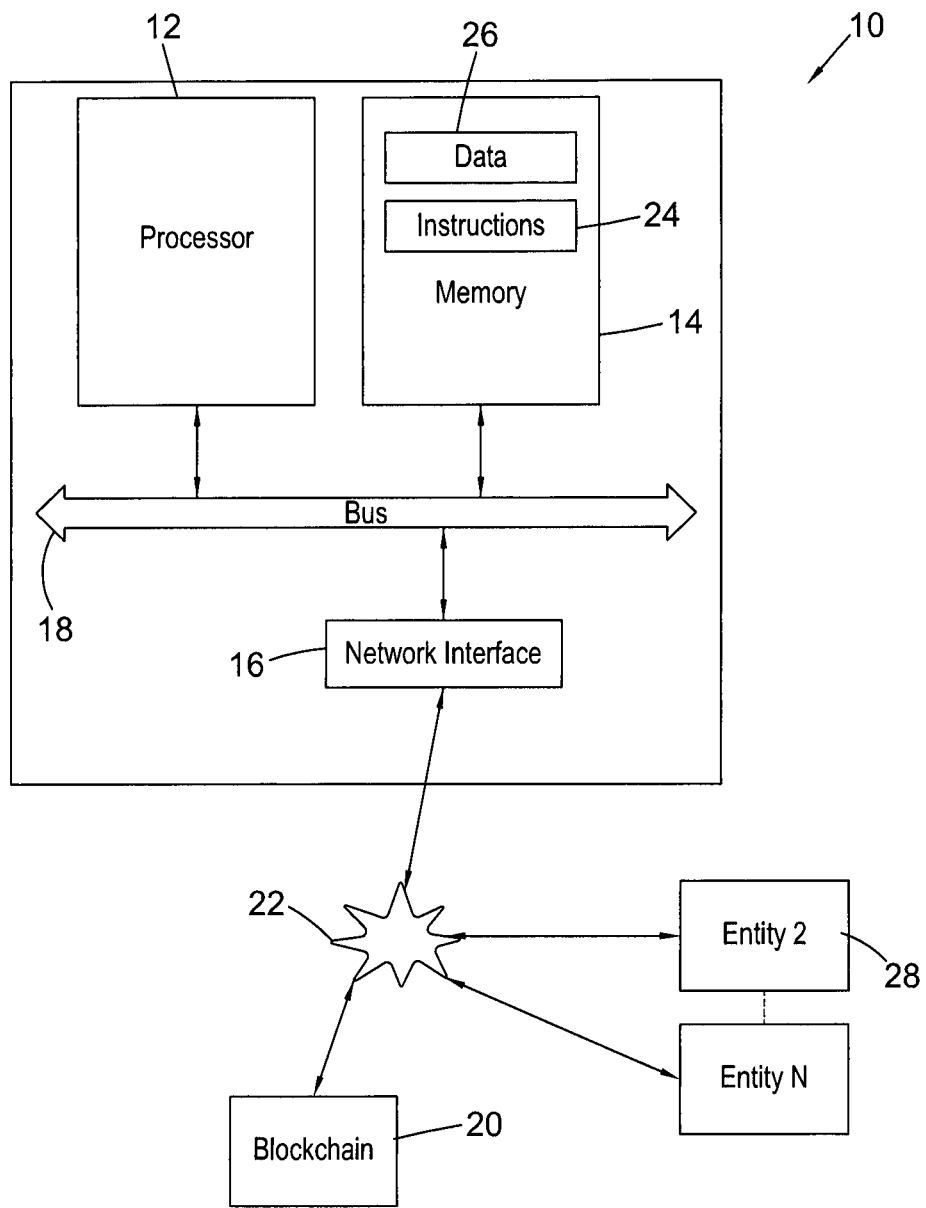
FIG. 1 is a schematic diagram of an example system to generate financial accounting records.

The present disclosure generally relates to a method and a system which uses a peer-to-peer (P2P) distributed ledger (hereafter "blockchain"), such as the Bitcoin Blockchain, in the identification, extraction, transmission, processing and/or update of data. The invention provides a secure, cryptographically enforced solution for using blockchain-posted data to augment, add to or integrate with data in a computer-based resource provided within an organisation (entity). The computer-based resource may be a data base, an accounting system or any other type of computer-based facility for the storage and/or processing of data. This system may be referred to as an "internal" system as it is internal to the organisation rather than part of the blockchain.

The invention provides a data control and security solution by assigning cryptographic keys to elements associated with an entity or sub-entity. The elements are organised into a (linear or tree) structure which is defined or specified by the relationships between the elements. Each element within the structure is associated with a cryptographic public/private key pair, with a root key pair at the top of the structure. Elements which are lower in the structure are associated with key pairs which are deterministically derived from a previous key-pair. This deterministic derivation may, preferably, be performed in accordance with a method substantially as described in the section below entitled "Method of sub-key generation". Thus a hierarchy of cryptographic key-pairs is generated to reflect the hierarchical relationship between elements within the entity. In the following illustration, the term "accounts" may be used instead of "element".

Purely for the sake of illustration, and without any intention to limit the nature of the invention to this use or application area, an example is now provided in which the invention is used to generate financial accounting records for a structure of interest of an entity. It is important to note that this financially-oriented aspect is not essential to the invention, and that the invention can be used in conjunction with any type of internal computer-based system, and for the control, transmission and security of any type of data.

In our example, the structure of interest may for example be a business unit, such as a department or sub-entity within the entity, or may represent the complete entity for which the output (e.g. accounting records) are to be generated. Alternatively, the structure of interest may relate to a product or service of interest or any suitable structure of the entity for which financial accounting records are to be generated and optionally posted to, for example, the general ledger of the entity.

Embodiments of the present disclosure provide significant advantages. For example, it is an advantage to utilise a public blockchain, such as the Bitcoin Blockchain, to generate the record of financial transactions as the Bitcoin Blockchain is inherently decentralised. This means that the transaction records on the Bitcoin Blockchain are stored synchronously across the network which ensures that all information is distributed and publicised.

Furthermore, the generated financial accounting records for the structure of interest may be recorded on the same blockchain, for example in the form of metadata in a transaction record. This will provide the advantage that a permanent, immutable and public record is formed which is a true and accurate reflection of the activities of an entity. This may ultimately remove the requirement of the assistance of external parties, such as auditors.

Referring now to FIG. 1, there is shown a computer system 10 for generating accounting records in accordance with illustrative embodiments of the present disclosure. The financial accounting records may for example be posted to a financial accounting ledger, such as the general ledger of the entity.

In the present example, the computer system includes a processor 12 arranged to control and coordinate operations, a memory 14, and a network interface 16 that communicate with each other via a bus 18. The network interface 16 facilitates wireless communication between the computer system 10 and a P2P distributed ledger, such as the Bitcoin Blockchain 20, through a communications network, which in this example is the Internet 22.

The memory 14 stores instructions 24 and data 26 for the processes as described in the following, and the processor 12 performs the instructions 24 from the memory 14 to implement the processes. It should be noted that although the computer system 10 is shown as an independent network element, the computer system 10 may alternatively be part of another network element and functions performed by the computer system 10 may be distributed between multiple network elements. The computer system 10 may represent a computer system of a first entity.

FIG. 1 further shows a further computer system 28 of a second entity. This is for illustrative purposes only and it will be appreciated that other computer systems or entities may be part of the network.

Financial Accounting Ledger for an Entity/General Ledger

As mentioned above, a general ledger is a set of accounts that summarises all financial transactions occurring within an entity. It is typically used as the main financial record of an entity and incorporates all financial transactions (accounts) relating to an entity. These may include the asset accounts (for example, cash and cash equivalents, securities, accounts receivable, inventory and intellectual property) and liability accounts (for example, notes payable, accounts payable, expense accounts, loans). The above examples of accounts are merely exemplary and not to be taken as restrictive. Each account in the general ledger traditionally maintains a balance of the financial position of the entity based on monetary exchange for each account.

While both small and large entities need to maintain a record of the accounts by way of the general ledger, larger entities may need to track thousands or even hundreds of thousands of accounts. Such tracking may become a great and potentially complex task. There are several difficulties that come with maintaining a very large general ledger with such ledgers possibly taking days to audit or balance.

Further to this, some organisations may consider introducing sub-ledgers within the general ledger to simplify the complexity of the general ledger.

General ledgers may be the subject to internal and external audits of an entity. Auditing is often a tedious and time-consuming task that is performed by specially designated auditors. However, by recording the general ledger or one or more of the sub-ledgers on a publicly viewable blockchain, this potentially facilitates and alleviates the tasks of auditors.

In the following, the term "financial accounting ledger" may refer to the general ledger of an entity or to one or more of the sub-ledgers within the general ledger. However, the invention is not limited to use only with financial or accounting systems, and any other type of computer-based system may be used.

The Bitcoin Blockchain

Whilst embodiments described below may refer specifically to transaction records on the Bitcoin Blockchain (or simply the Blockchain), it will be appreciated that the present disclosure may be implemented using any blockchain. The Bitcoin Blockchain is used below to describe aspects of the present disclosure for simplicity only due to its high level of standardisation and large quantity of associated public documentation.

The Blockchain is a public transaction ledger which is distributed across networked nodes participating in a system based on the Bitcoin protocol. Each Bitcoin transaction is broadcast to the network, the transactions are confirmed and then aggregated into blocks. These blocks are then included on the Blockchain.

A full copy of a blockchain contains every transaction (Tx) posted to the ledger since its inception. Thus, a continuously growing list of transaction records is provided. Since each transaction entered onto the Blockchain is cryptographically enforced, the Blockchain is hardened against tampering and revision, even by operators of the data store nodes.

Due to the transparency of the Bitcoin Blockchain, transaction histories are publicly available for each transaction. It is a further advantage of the Blockchain that the transaction and the record of the transaction are the same, i.e. the record of the transaction is embedded within the transaction.

In this way, the information relating to the data exchange is captured in the actual transaction (Tx). This record is permanent and immutable, and each transaction that is conducted using Bitcoin is therefore not only facilitated by the Blockchain, but also immutably recorded in the Blockchain. This therefore removes the requirement for a third party to keep the transaction record on a separate database.

In embodiments of the present disclosure, instead of or in addition to being used in its designed function of storing transaction records representing payments of Bitcoins from one party to another, the Blockchain is used in a novel manner to generate data for a structure of interest of an entity or organisation, such as a business unit or a product of interest. The data can be used in any foreseeable manner such as, for example, the generation of accounting records. For the sake of simplicity, but without limitation, the following illustration will refer to "accounting records". In this example, the generated accounting records are suitable for posting to the general ledger of an entity, or feeding to a dedicated accounting system of the entity.

While the exemplary embodiments below refer to the Bitcoin Blockchain as the public ledger, it is to be understood the disclosure also applies to any blockchain platform or protocol.

Functional Components of the Computer System

Figure 2:
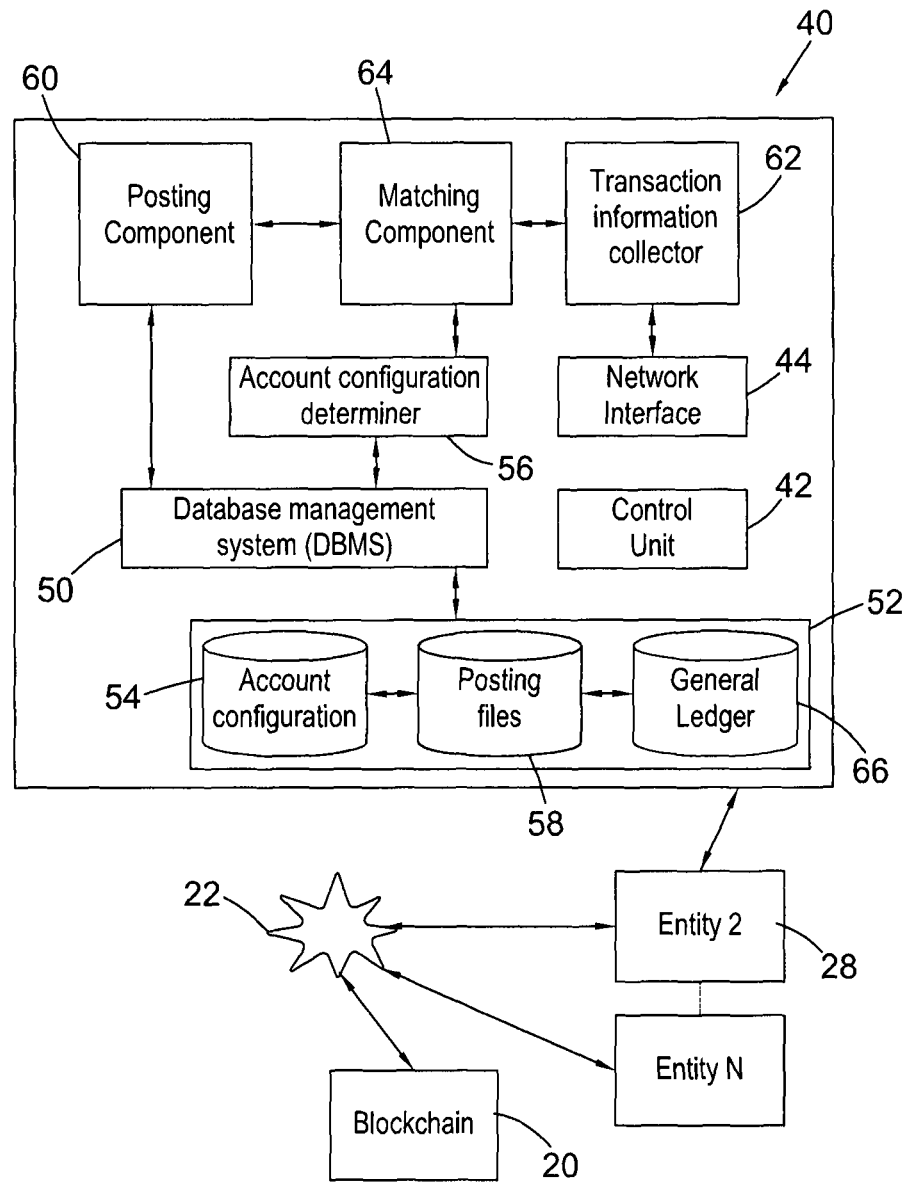
FIG. 2 is an alternative schematic diagram of an illustrative computer system to generate financial accounting records.

A representation of an example implementation of a computer system 40 is shown in FIG. 2, with functional components of the computer system 40 shown instead of hardware components. The functional components in this example may be implemented using the hardware components of the computer system 10 shown in FIG. 1 such that network interfaces are provided for facilitating access to the Bitcoin Blockchain.

In this example, the computer system 40 comprises a control unit 42 for controlling and coordinating operations of the components of the computer system 40. This control unit 42 may for example be implemented by the processor 12 shown in FIG. 1.

Further, the computer system 40 has a network interface 44 for facilitating access to information stored on the Bitcoin Blockchain 20 through the Internet 22.

The computer system 40 further comprises a data base management system ("DBMS") 50 that stores data that is received and/or generated in the computer system 40 in a data storage 52. It will be understood that the data may alternatively be stored in a remote database, such as in a cloud storage and can be received at the computer system 40 through the Internet 22 via the network interface 44.

The data storage 52 comprises a memory for storing accounting configuration data 54 of the first entity. For example, the accounting configuration data 54 may comprise a chart of accounts which collects account names and identifiers for each account. This may further include information on the public root keys as will be described in further detail with reference to FIG. 4.

The stored accounting configuration data 54 may be accessed by an account configuration determiner 56 of the computer system 40.

The data storage 52 further comprises a memory for storing posting files 58 that are created by a posting component 60 of the computer system 40. For example, generated financial accounting records may be written to one or more posting files that can be stored in the data storage 52.

The computer system 40 further comprises a transaction information collector 62 that is in communication with the network interface 44 to obtain transaction information from transaction records on the Bitcoin Blockchain 20 via the Internet 22.

A matching component 64 of the computer system 40 is in communication with the account configuration determiner 56 and the transaction information collector 62. The matching component 64 is configured to match extracted transaction information from the Blockchain to identified public keys associated with respective accounts of the entity to generate financial accounting records.

As mentioned above, these generated financial accounting records may then be written to one or more posting files and can be posted to the general ledger 66 of the entity in the data storage 52.

Overview of Illustrative Method to Generate Financial Accounting Records

In the following, the method of generating financial accounting records is divided into four main method steps, i.e. determining 100 accounting configuration, extracting 200 transaction information from transaction records on the Blockchain, generating the financial accounting records and creating 300 one or more posting files, and posting 400 the one or more posting files to the general ledger of the entity.

The first structure of interest may be any suitable structure of the first entity for which accounting records are to be generated. For example, the first structure may relate to the first entity in its entirety and generated accounting records will be posted to the general ledger of the first entity. In another example, the first structure of interest may represent a business unit, such as a department, a team or a specified group of employees. Alternatively, the first structure of interest may relate to a first product or service which may span across a plurality of business units. In this way, the generated accounting records can be created to analyse the accounts associated with a desired product or service.

Account Configuration

Figure 3:
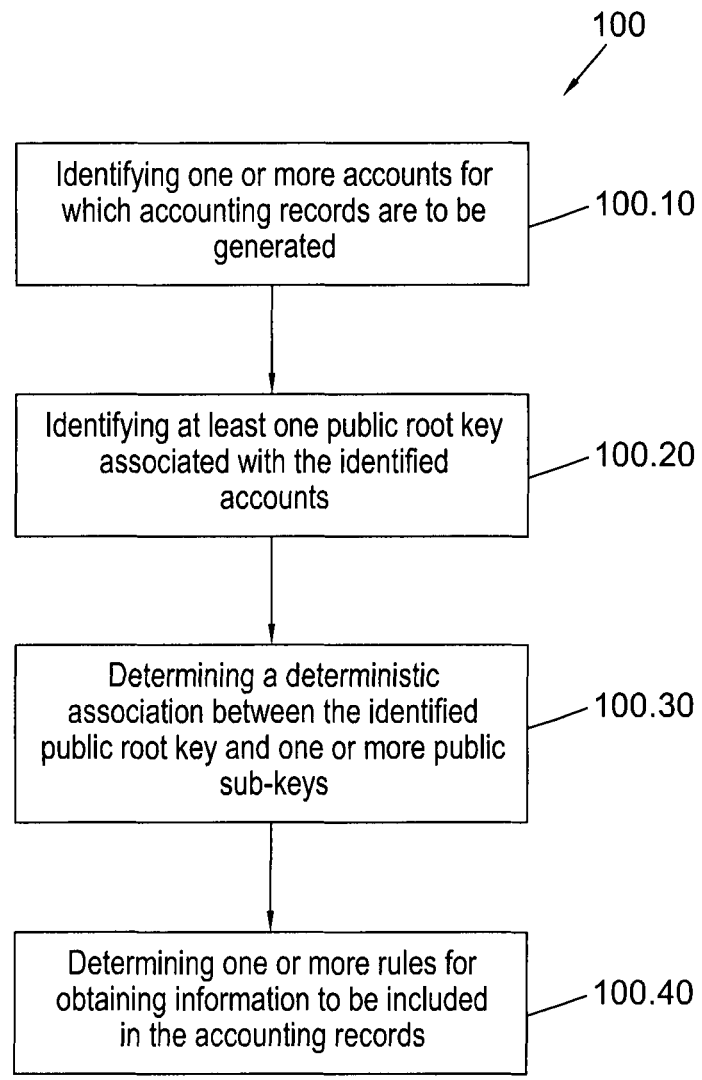
FIG. 3 is a flow chart of an illustrative computer-implemented method for determining accounting configuration to generate financial accounting records.
Figure 4:
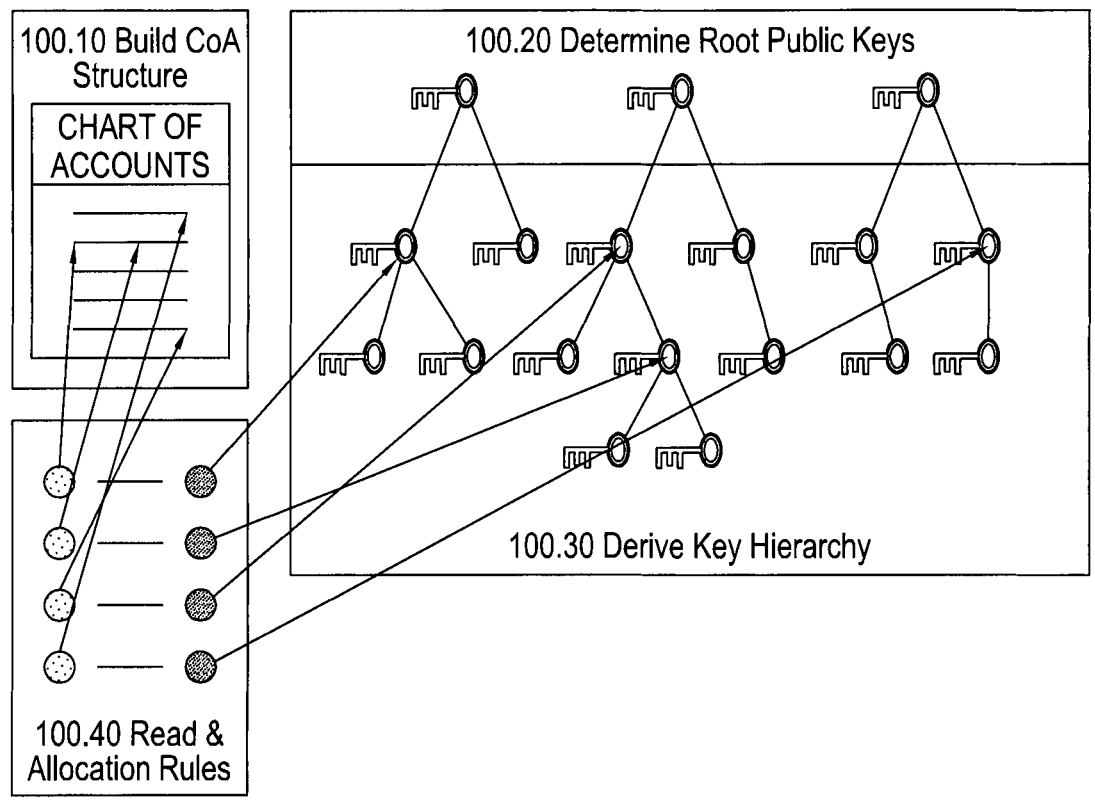
FIG. 4 is a schematic diagram illustrating a deterministic association between a root public key and one or more public sub-keys.

Referring now to FIGS. 3 and 4, there is shown a flow chart illustrating method steps for determining 100 accounting configuration, and a schematic illustration of some of the method steps of method 100.

In particular, the method 100 may include a step of identifying a set of first entity public keys comprising at least one public root key associated with the first entity and one or more associated public sub-keys. Each of the sub-keys may represent an account within the first entity. In this regard, the set of first entity public keys may initially be identified by identifying 100.10 one or more accounts for which financial accounting records are to be generated.

In a further step, at least one public root key associated with the identified one or more accounts is identified 100.20. This may be done by accessing data stored on an internal data storage of the first entity, such as data storage 54 shown in FIG. 2. The internal data storage may store a chart of accounts which collects account names and identifiers for each account. The identifiers may include the associated public root key. In the example as shown in FIG. 3, the method 100 identifies three public root keys which may represent accounts of three distinct business units.

The method 100 further comprises a step of determining 100.30 a deterministic association between the identified public root keys and one or more public sub-keys. In other words, a rule is determined to derive one or more public sub-keys that are dependent on the public root keys. In this particular example as shown in FIG. 4, the deterministic association defines a tree hierarchy where each of the three identified public root keys is associated with successive child and grandchild tree nodes.

Following the determination of the deterministic association in step 100.30, one or more public sub-keys associated with the at least one root key are determined and some are selected using the information from the chart of accounts in step 100.10. It will be appreciated that depending on the identification of the accounts for which the accounting records are to be generated, all or only part of the sub-keys that are dependent on the public root key are determined.

In this particular example as shown in FIG. 4, four public sub-keys are selected for the generation of financial accounting records; a first child of the first public root key, a first child and a first grandchild of the second public root key, and a second child or the third root key. The four public sub-keys may for example be associated with a specific product or service that spans across the three distinct business units represented by the root keys.

In one specific example, a series of successive deterministic public keys may be determined where each successive public key may be determined based on the preceding public key. For example, Elliptic Curve Cryptography (ECC) may be used. In this regard, a sub-key may be determined by initially determining a deterministic key (DK) that is based on a cryptographic hash of a message (M) which may be random, pseudo random, or pre-defined. A sub-key may then be determined based on a scalar addition of the associated public parent key and the scalar multiplication of the deterministic key (DK) and a generator (G). In order to re-determine the deterministic key (DK) and thereby the sub-keys, only the message (M) and the generator (G) are necessary. In this regard, the message (M) may be stored in the form of metadata of a transaction record on the Blockchain, for example in the form of an invoice number.

In a further example, the message may be rehashed for determining the next generation public sub-key.

The steps for determining successive public keys as briefly described above are described and illustrated in further detail below in the section entitled "method of sub-key generation".

In a further step 100.40, one or more rules are determined for obtaining information to be included in the financial accounting records for the selected public keys. In other words, method step 100.40 determines what information will be required for the accounting records to be generated for the general ledger and how this information will be obtained.

In particular, the information may include:

Transaction input/output;

The General Ledger account to post to

The General Ledger account to counter-post to

A rule for calculating the value for the transaction

A rule for deriving the narrative for the transaction

Extracting Information from the Blockchain

Figure 5:
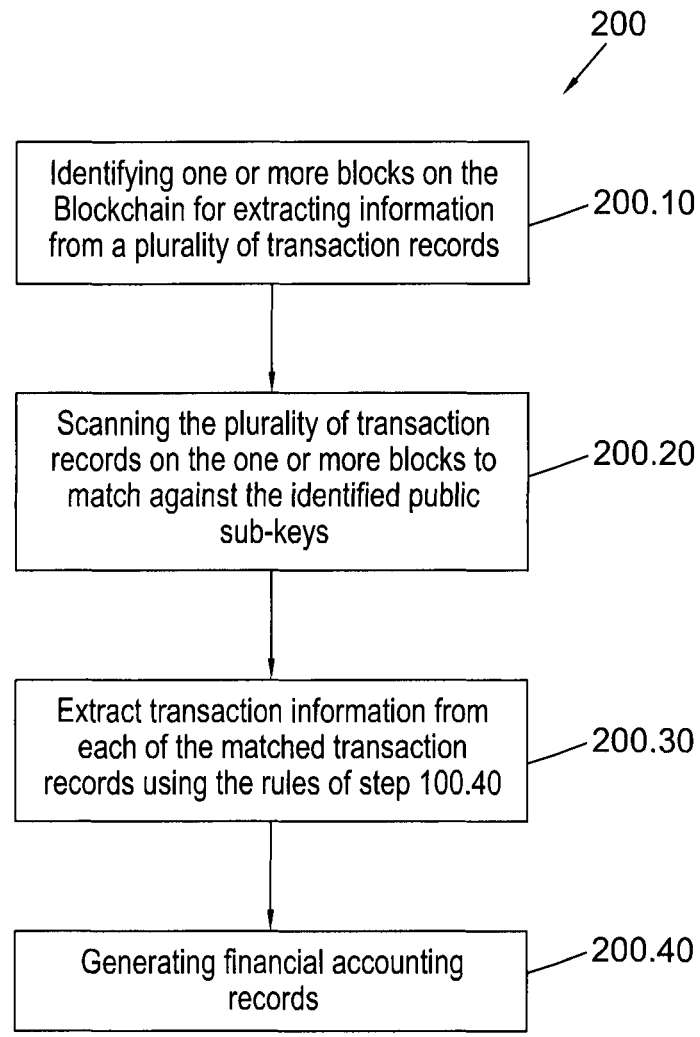
FIG. 5 is a flow chart of an illustrative computer-implemented method for extracting information from a P2P distributed ledger (blockchain) to generate financial accounting records.

Referring now to FIG. 5, there is shown a flow chart illustrating a method 200 including method steps for extracting 200 information from the Bitcoin Blockchain.

Initially, the method 200 comprises a step of identifying 200.10 one or more blocks of the Blockchain for extracting transaction information from a plurality of transactions that are recorded on the Blockchain. For example, the step of identifying 200.10 the one or more blocks may comprise identifying a first block number associated with a block that contains transaction records that have not previously been used for generating financial accounting records. This may be done by identifying the relevant block number of the block which is part of each transaction record on the Blockchain. Alternatively, the one or more blocks may be identified based on a transaction date or time. As described above, the blocks on the Bitcoin Blockchain have a defined order and each block includes a hash of the previous block.

Once the one or more blocks have been identified, a plurality of transaction records associated with the first structure of the entity is scanned 200.20 on the Blockchain to match against the sub-keys identified in step 100.30.

In a further step 200.30, the rules determined in step 100.40 are run to extract transaction information from each of the matched transaction records on the Blockchain. Thus, it will be determined what information needs to be extracted, how to derive certain information from the extracted information and where/how to post the information to the general ledger.

For example, one or more of the following information from the plurality of transaction records are extracted:
a transaction input value;
a transaction output value;
public keys;
metadata;
a rule for deriving the transaction input or output value based on the information indicative of the transaction;
a time stamp for the transaction; and
a block number of a block of the P2P distributed ledger.

Once the transaction records within one block have been scanned and processed, the next block in the Blockchain will be scanned for transaction records associated with the first entity.

The extracted information from step 200.30 is then used to generate 200.40 the financial accounting records.

Transaction Records

In the following, a transaction record stored on the Bitcoin Blockchain will be considered in further detail.

Each transaction record on the Bitcoin Blockchain comprises at least a first structure public key associated with the first structure. This identifies that the first structure of the entity is involved in the transaction that is stored on the Bitcoin Blockchain.

Further, each transaction (Tx) on the Bitcoin Blockchain comprises at least information indicative of a transaction between the first entity and a further entity. It should be noted that any type of entity may be exchangeable between the first entity and the further entity and stored in a transaction.

Examples of transaction may include cryptocurrency exchanges, such as Bitcoin transactions, fiat transactions, tokens (representing any type of transferrable contract or asset), contracts, and goods and services of any type.

Tokens

Tokens may represent an asset, or a contract conferring specified rights upon the holder to be redeemed for fiat currency (virtual banknotes), to denote ownership of property (e.g., title deeds), or grant access to an event (tickets), to name a few of many examples. Goods and services may include new or second hand products, labour (e.g., charged by the hour), complete jobs (e.g., mowing the lawn), to name a few of many examples.

A token is an exchangeable entity represented by/representative of a contract. The contract may take one of several forms. For example, the contract may confer a right upon the holder or denote ownership of property. The value of the token may be contractually specified and is linked to the underlying BTC amount via a 'pegging rate'. The token is exchangeable via novel type of transaction using a cryptocurrency protocol such as the bitcoin protocol. The bitcoin value on the transaction acts as a token representing a rights contract in digital form. The contract itself may be stored on the transaction or may be kept in a publicly accessible location, or may be held privately by the parties to the contract depending on the particular embodiment. Where the contract is not stored on the transaction, the transaction may store a unique pointer to the contract.

Tokens may be divisible. A divisible token is one in which the value on the transaction output can be subdivided into smaller amounts which can be allocated across multiple new tokens. Examples of divisible tokens include tokens for fiat currency or for shares in a race horse. Divisible contracts may be defined as those that specify a non-zero pegging rate. In other words, the token value is tied to the underlying bitcoin value. Alternatively, tokens may be non-divisible. A non-divisible token is a contract that specifies the holder's rights in terms of a fixed value, e.g. a contract to redeem a house or AU$1000. Non-divisible tokens are therefore not linked to the value of the underlying bitcoin.

Tokens must be digitally signed by a token issuer to be valid. The issuer may, for example be an authority such as a Registrar of Title deeds. The issuer may issue a token to a user in return for payment. That token may then give the user the right to exercise the contract linked to the token, whether the contract represents the right to redeem fiat currency or for a service to performed.

Examples of tokens in accordance with the above, include the following:

A fiat currency token that is pegged to the BTC value of the transaction output by the issuer of the contract. For example "the spender of this token (bitcoin transaction) is entitled to redeem any fraction of this token for Canadian dollars (CAD) at a rate of 1 share (10 cents) for every 1000 satoshis".

A race horse owned by several members of a syndicate Any item where the ownership is by a title deed, e.g., a house or other property could be treated in this way.

An electronic contract representing a concert ticket. This is inherently non-divisible.

A bearer bond (non-divisible)

A unique identifier attached to a Goods/service (such as a bar code or RFID). If used, this identifier is still preferably validated by a signature of an authorised entity; without a signature it will fall into the less secure 'goods/service' category (described below).

A contract for the right to a service to be performed. It is noted that this is not the same as the actual service itself, but only the right to have the service performed for them. This right can be traded. For example, a voucher from Michael's Mowing for up to 3 hours lawn mowing within the Sydney metropolitan area. The holder of this voucher (contract) can redeem it for the actual service.

Tokens must specify the value of a share, e.g., 1 share=10 cents CAD, 1 share=1 rupiah, or 1 share=1% ownership of an item or property (race horse, house, etc.).

Posting Files

Figure 6:
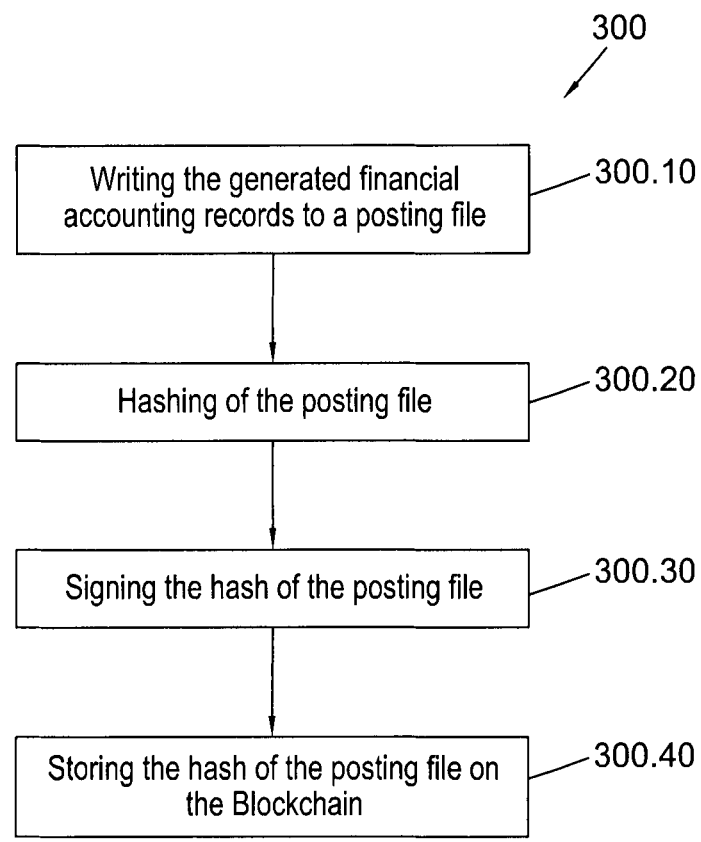
FIG. 6 is a flow chart of an illustrative computer-implemented method for posting the generated financial accounting records to a financial accounting ledger.

Referring now to FIG. 6, there is shown a flow chart illustrating method steps of a method 300 of creating one or more posting files.

The method 300 comprises a step of writing 300.10 the generated accounting records from step 200.40 into one or more posting files. This may including consolidating specified information for posting purposes to the general ledger. For example, the generated accounting records may be consolidated by date, or each accounting record may represent an individual file.

The one or more posting files may have any suitable format, such as but not limited to JSON, XML or XBRL. The format may be predefined by the general ledger.

The method 300 may further comprise hashing 300.20 the one or more posting files. For example, a cryptographic hash algorithm may include SHA-256 to create a 256-bit posting file hash.

The method 300 may further comprise a step of signing 300.30 the hash of the posting file. The hash of the posting file may, for example, be signed with a private key that is part of an asymmetric cryptography pair having the private key and an associated public key. In this way, the signed hash of the posting file can be validated using the associated public key.

Following the step of hashing 300.20 the one or more posting files, the hash is stored 300.40 on the Blockchain for permanent and unchangeable proof. For example, the hash of the posting file may be stored in the form of metadata of a transaction record. As described above with reference to the P2SH, the posting file may be stored in the form of a "false" public key within the script.

In a specific example, the agent application may be used to record the hash of the posting file and the block number range on the Blockchain as the contract transaction.

Posting to General Ledger

In the following, method steps of method 400 are described of posting the one or more posting files to the general ledger of the first entity.

As described above, the general ledger is a set of accounts that summarises all transactions that occur within the entity. The method 400 of posting the one or more posting files to the general ledger may comprise accessing the one or more posting files in a secure manner and validating that the one or more posting files come from a recognised source. In this regard, the method 400 may comprise obtaining the public key that is associated with the private signing key used in step 300.30 to validate the signature.

Once the one or more posting files have been successfully validated, the one or more posting files are applied to the general ledger.

Dedicated Accounting System

In one example, the financial accounting records are generated so that the accounting records can be fed into a dedicated accounting system of the entity. For example, the accounting system of the entity may be configured to execute a dedicated accounting software for the entity.

It will be appreciated that Bitcoin transactions may only form part of an entity's trading position. In such a case, the generated financial accounting records utilising the transaction records on the Bitcoin Blockchain may be incorporated into an existing accounting model.

Method of Sub-Key Generation

In accordance with the present invention there is a need to generate a sub-key from an original (master) key. A method for achieving this is now provided for illustration of one way in which this could be performed. The following provides an illustrative use of a technique which can be used in accordance with, or adapted for use with, the present invention. The following description is provided with reference to FIGS. 17 to 13.

Figure 7:
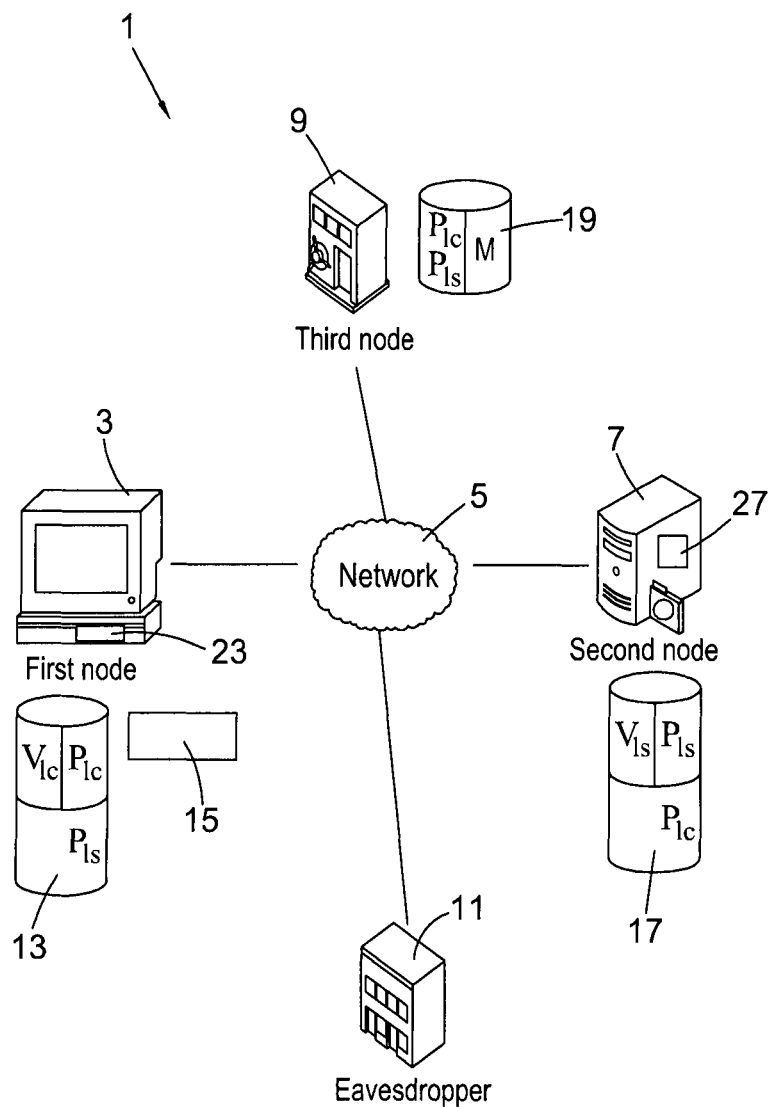
FIGS. 7 to 13 show various aspects of an illustrative technique for deriving sub-keys from a parent key as discussed below, this technique being suitable for use in relation to aspects of the present invention.

FIG. 7 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

Figure 8:
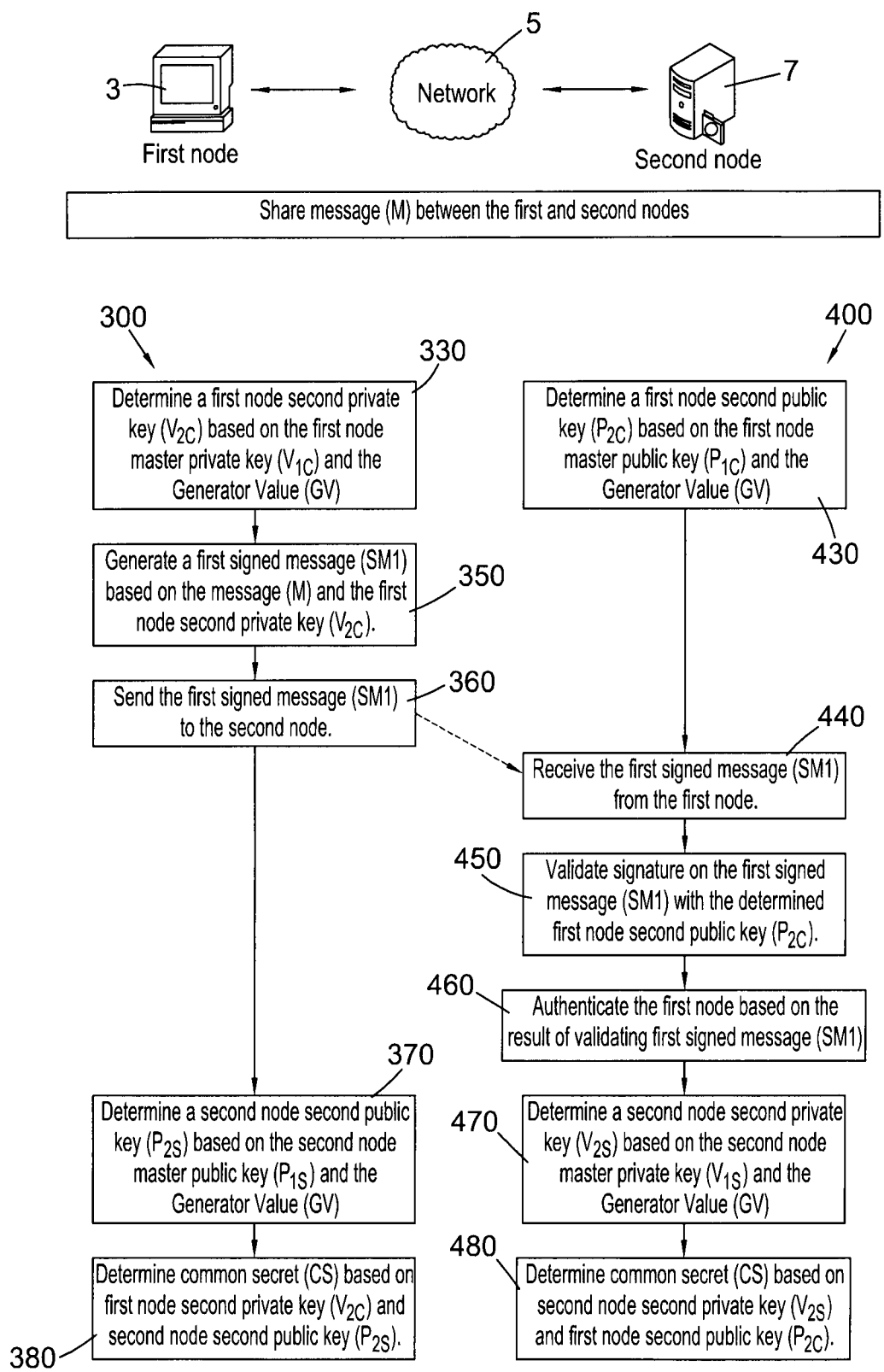

The methods 300, 400 may include additional steps. See FIG. 8. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 9, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C} = V_{1C} \times G \qquad \text{(Equation 1)}$$

Thus the first asymmetric cryptography pair includes:

$V_{1C}$: The first node master private key that is kept secret by the first node.

$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 9:
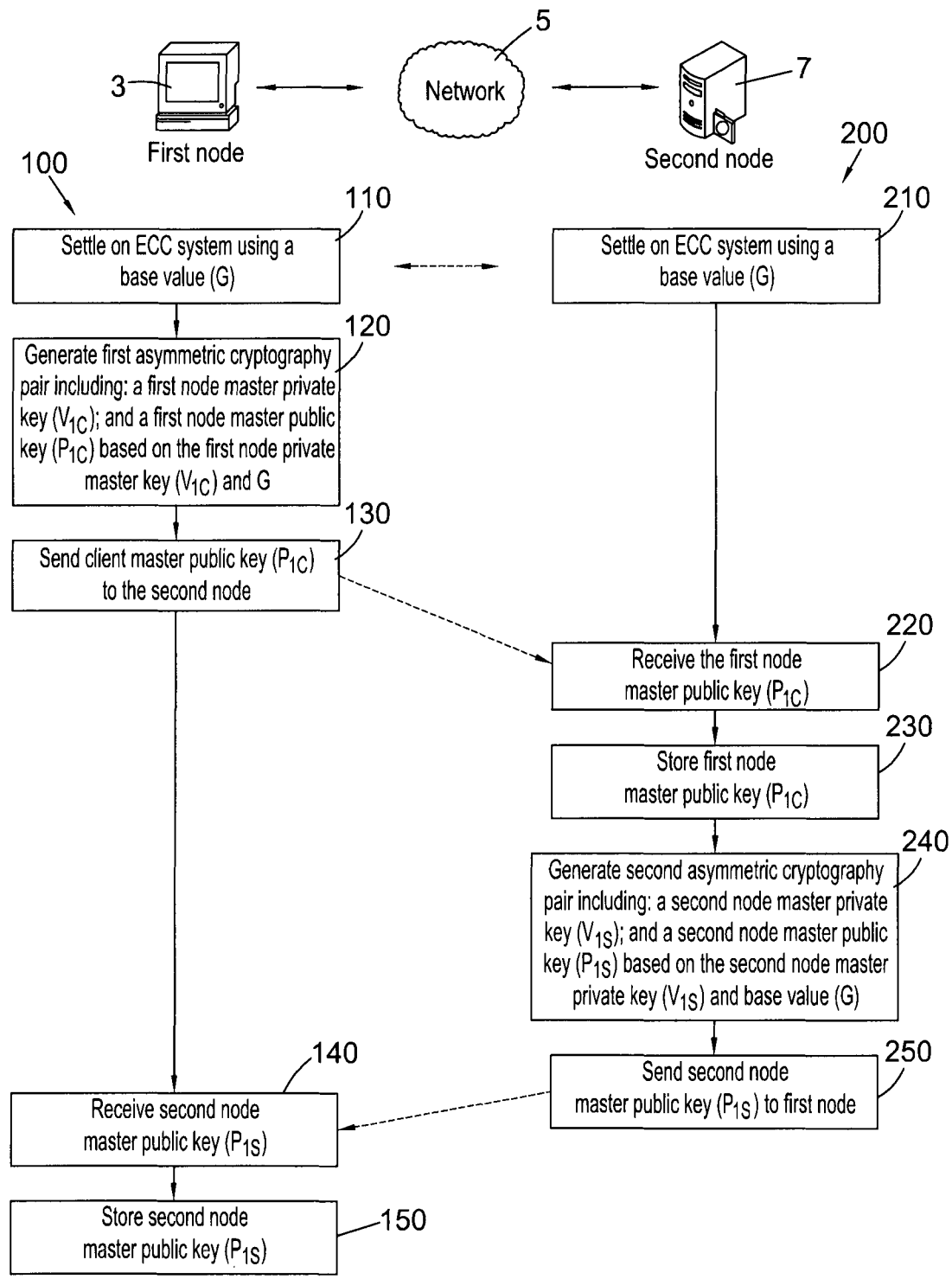

The method 100 further includes sending 130 the first node master public key ($P_{1C}$), over the communications network 5, to the second node 7, as shown in FIG. 9. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S} = V_{1S} \times G \qquad \text{(Equation 2)}$$

Thus the second asymmetric cryptography pair includes:

$V_{1S}$: The second node master private key that is kept secret by the second node.

$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 10:
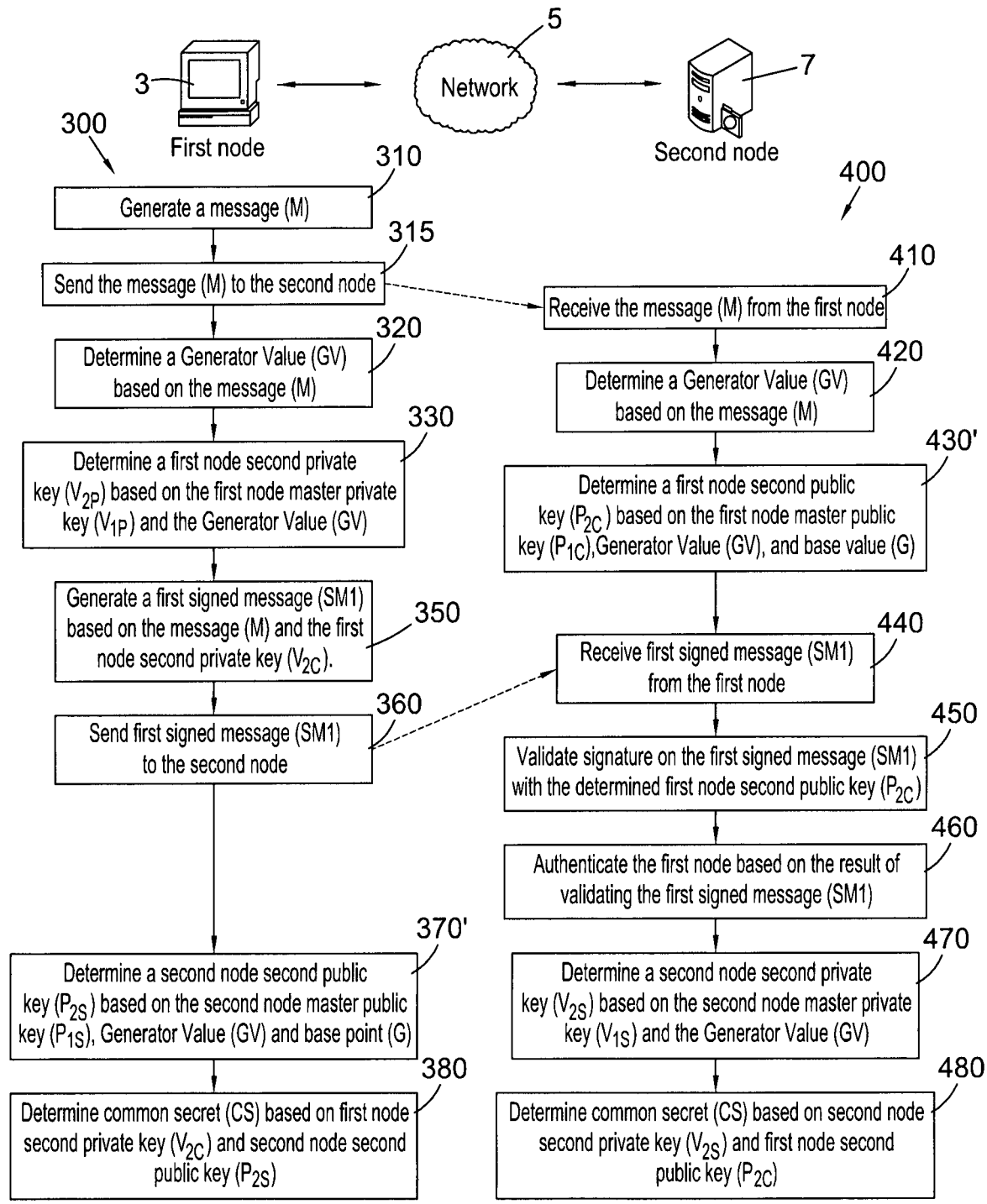

An example of determining a common secret (CS) will now be described with reference to FIG. 10. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message }(M)=\text{UnixTime+nonce} \tag{Equation 3}$$

In some examples, the message (M) is arbitrary. However it is to be appreciated that the message (M) may have selective values (such as account number, Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV=SHA\text{-}256(SM) \tag{Equation 4}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C}=V_{1C}+GV \tag{Equation 5}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C}=V_{2C} \times G \tag{Equation 6}$$

Substitution of $V_{2C}$ from Equation 5 into Equation 6 provides:

$$P_{2C}=(V_{1C}+GV) \times G \tag{Equation 7}$$

where the '+' operator refers to elliptic curve point addition. Noting that elliptic curve cryptography algebra is distributive, Equation 7 may be expressed as:

$$P_{2C}=V_{1C} \times G+GV \times G \tag{Equation 8}$$

Finally, Equation 1 may be substituted into Equation 7 to provide:

$$P_{2C}=P_{1C}+GV \times G \tag{Equation 9.1}$$

$$P_{2C}=P_{1C}+SHA\text{-}256(M) \times G \tag{Equation 9.2}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a second node second public key 370' The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S}=V_{2S} \times G \tag{Equation 10.1}$$

$$P_{2S}=P_{1S}+GV \times G \tag{Equation 10.2}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C} = V_{2C} \times G \quad \text{(Equation 12.1)}$$

$$P_{2C} = P_{1C} + GV \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Figure 11:
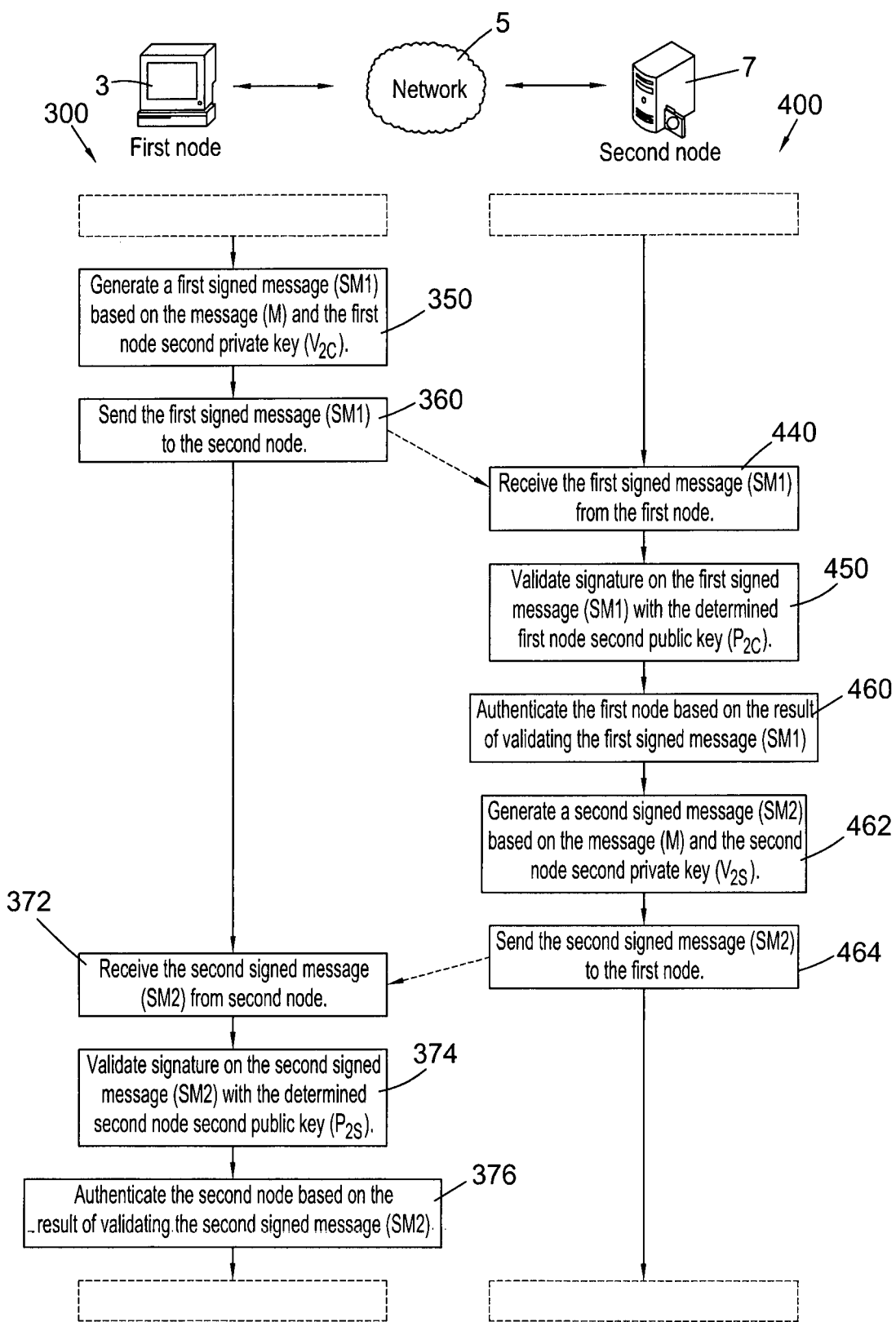

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message—see FIG. 11.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S} = V_{1S} + GV \quad \text{(Equation 13.1)}$$

$$V_{2S} = V_{1S} + SHA\text{-}256(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{2C} \quad \text{(Equation 14)}$$

Proof of the common secret (CS) determined by the first node 3 and second node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point (xs, ys). This may be converted into a standard key format using standard publicly known operations agreed by the nodes 3, 7. For example, the xs value may be a 256-bit integer that could be used as a key for AES256 encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (Keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M'=SHA\text{-}256(M) \qquad \text{(Equation 18)}$$

$$GV'=SHA\text{-}256(M') \qquad \text{(Equation 19.1)}$$

$$GV'=SHA\text{-}256(SHA\text{-}256(M)) \qquad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}'=P_{1S}+GV' \times G \qquad \text{(Equation 20.1)}$$

$$V_{2C}'=V_{1C}+GV' \qquad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}'=P_{1C}+GV' \times G \qquad \text{(Equation 21.1)}$$

$$V_{2S}'=V_{1S}+GV' \qquad \text{(Equation 21.2)}$$

The first node 3 and the second node 7 may then each determine the next generation common secret (CS'). In particular, the first node 3 determines the next generation common secret (CS') with the formula:

$$CS'=V_{2C}' \times P_{2S}' \qquad \text{(Equation 22)}$$

The second node 7 determines the next generation common secret (CS') with the formula:

$$CS'=V_{2S}' \times P_{2C}' \qquad \text{(Equation 23)}$$

Further generations (CS'', CS''', etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

Figure 12:
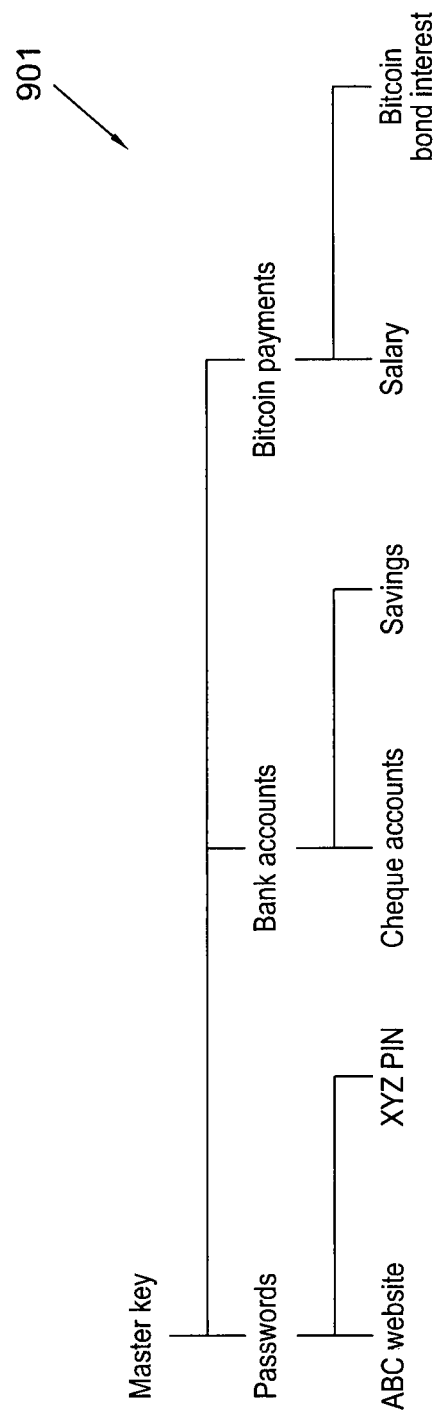

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 12 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C}=V_{1C}+SHA\text{-}256(M) \qquad \text{(Equation 24)}$$

$$V_{2C}'=V_{1C}+SHA\text{-}256(SHA\text{-}256(M)) \qquad \text{(Equation 25)}$$

$$V_{2C}''=V_{1C}+SHA\text{-}256(SHA\text{-}256(SHA\text{-}256(M))) \qquad \text{(Equation 26)}$$

... and so on.

To create a branch, any key can be used as a sub-master key. For example $V_{2C}'$ can be used as a sub-master key ($V_{3C}$) by adding the hash to it as is done for the regular master key:

$$V_{3C}=V_{2C}'+SHA\text{-}256(M) \qquad \text{(Equation 27)}$$

The sub-master key ($V_{3C}$) may itself have a next generation key ($V_{3C}'$), for example:

$$V_{3C}'=V_{2C}'+SHA\text{-}256(SHA\text{-}256(M)) \qquad \text{(Equation 28)}$$

Figure 13:
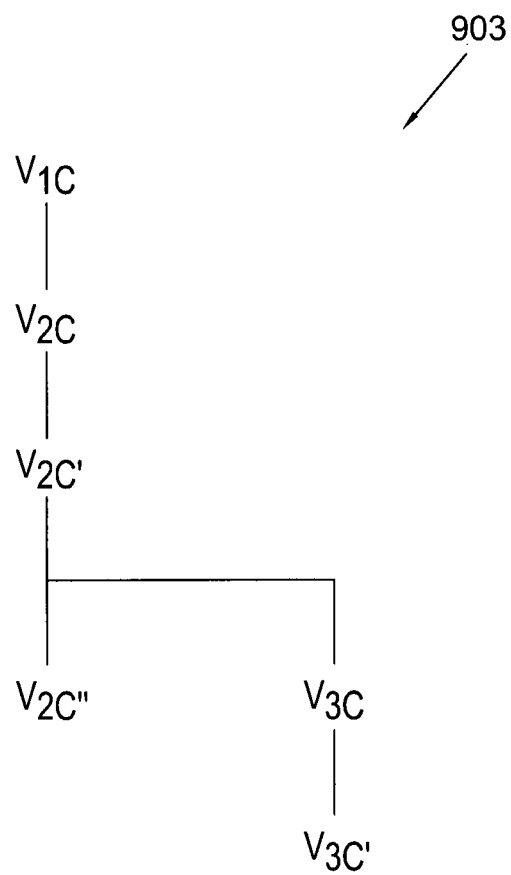

This provides a tree structure 903 using the master key spawning method as shown in FIG. 13.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

The invention claimed is:
1. A computer implemented method comprising:
   storing, by a processor, an accounting configuration data of an entity, wherein the accounting configuration data comprises information of public root keys associated with structures of interest of the entity, a chart of accounts including information of the accounts, wherein the accounts are associated with the entity;
   generating, by the processor, a deterministic key (DK) by hashing a message (M), wherein the message (M) is associated with a first structure of interest of the entity;
   generating, by the processor, public sub-keys using Elliptic Curve Cryptography (ECC), wherein generating the public sub-keys further comprises generating the public sub-keys based on at least one public root key of the first structure of the entity and the generated deterministic key (DK), wherein the accounts are associated with the public sub-keys;

receiving, by the processor, a request to generate financial accounting records from transactions in a blockchain for the first structure of interest of the entity;
based on the received request, identifying, by the processor, a set of first structure public keys comprising the at least one public root key associated with the first structure of interest of the entity and one or more public sub-keys, wherein the identifying the set of first structure public keys further comprises:
identifying the at least one public root key associated with the first structure of interest of the entity by accessing the accounting configuration data; and
determining the one or more of the public sub-keys based on the at least one public root key associated with the first structure of interest of the entity;
deriving, by the processor, a deterministic association between the at least one public root key and the one or more public sub-keys;
scanning, by the processor, blocks in the blockchain to identify a plurality of transaction records associated with the first structure of interest of the entity;
based on the scanning, extracting, by the processor, data from the plurality of transaction records from the blockchain, each of the extracted data of the plurality of transaction records comprising:
data indicative of a transaction (Tx) between the first structure of interest of the entity and at least one further structure; and
a first structure public key associated with the first structure of interest of the entity, wherein the first structure public key is part of a cryptographic public/private key, wherein the first structure public key is associated with one of the one or more public sub-keys; and
based on the extracted data, generating, by the processor, an output for the request to generate the financial accounting records for the first structure of interest of the entity by matching at least part of the set of first structure public keys to the extracted data using the deterministic association, wherein the generated output comprises the extracted data associated with the first structure of interest of the entity and the at least one further structure, and information of an account associated with the one or more public sub-keys;
posting, by the processor and over a communication network, the generated output to a computer based resource; and
storing, by the processor, the generated output on the blockchain by hashing the generated output, wherein storing the generated output further comprises storing the hashed output in a form of metadata of a blockchain transaction.

2. A method according to claim 1, wherein:
the one or more public sub-keys is generated based on a scalar addition of an associated public parent key and the scalar multiplication of a deterministic key (DK) and a generator (G).

3. The method of claim 1, wherein the step of deriving the deterministic association between the at least one public root key and the one or more associated public sub-keys comprises determining the one or more public sub-keys based on a rule.

4. The method of claim 1, wherein the deterministic association between the at least one public root key and the one or more associated public sub-keys is, or is based on, a tree hierarchy.

5. The method of claim 1, wherein the step of extracting the transaction data from the plurality of transactions records from the blockchain further comprises extracting one or more of the following data from the plurality of transaction records:
a transaction (TxI) input value;
a transaction output (TXO) value;
a rule for deriving the transaction input or output value based on the data indicative of the transaction; and
a time stamp for the transaction (Tx).

6. The method of claim 1, wherein the transaction between the first structure and the further structure relates to or comprises an exchange or transfer of cryptocurrency.

7. The method of claim 1, wherein the transaction between the first structure and the further structure relates to an exchange of a contract, a goods or services transaction, or a transfer of a tokenised asset.

8. The method of claim 7, wherein the transaction between the first structure and the further structure relates to an exchange of a contract, and wherein the contract confers specified rights upon the holder to be redeemed for fiat currency.

9. The method of claim 1, wherein the step of posting the generated output comprises writing the generated output to one or more posting files and signing the one or more posting files using a first structure private key, wherein the first structure private key is part of an asymmetric cryptography pair comprising the first structure private key and an associated first structure public key.

10. The method of claim 1, further comprising:
storing, by the processor, the generated output on an internal database or computer-based storage facility of the entity.

11. The method of claim 1, further comprising:
Hashing and/or signing, by the processor, the generated output for storing the generated output on a database or blockchain.

12. A computer system, comprising:
a processor; and
memory coupled with the processor and storing a set of instructions that, when executed by the processor, causes the processor to:
store an accounting configuration data of an entity, wherein the accounting configuration data comprises information of public root keys associated with structures of interest of the entity, a chart of accounts including information of the accounts, wherein the accounts are associated with the entity;
generate a deterministic key (DK) by hashing a message (M), wherein the message (M) is associated with a first structure of interest of the entity;
generate public sub-keys using Elliptic Curve Cryptography (ECC), wherein generating the public sub-keys further comprises generating the public sub-keys based on at least one public root key of the first structure of the entity and the generated deterministic key (DK), wherein the accounts are associated with the public sub-keys;
receive a request to generate financial accounting records from transactions in the blockchain for the first structure of interest of the entity;
based on the received request, identify a set of first structure public keys comprising the at least one public root key associated with the first structure of interest of the entity and the one or more public sub-keys, wherein the identifying the set of first structure public keys further comprises:

identifying the at least one public root key associated with the first structure of interest of the entity by accessing the accounting configuration data; and determining the one or more of the public sub-keys based on the at least one public root key associated with the first structure of interest of the entity;

derive a deterministic association between the at least one public root key and the one or more public sub-keys;

scan blocks in the blockchain to identify a plurality of transaction records associated with the first structure of interest of the entity;

based on the scanning, extract data from the plurality of transaction records from the blockchain, each of the extracted data of the plurality of transaction records comprising:

data indicative of a transaction (Tx) between the first structure of interest of the entity and at least one further structure; and a first structure public key associated with the first structure of interest of the entity, wherein the first structure public key is part of a cryptographic public/private key, wherein the first structure public key is associated with one of the one or more public sub-keys; and based on the extracted data, generate an output for the request to generate the financial accounting records for the first structure of interest of the entity by matching at least part of the set of first structure public keys to the extracted data using the deterministic association, wherein the generated output comprises the extracted data associated with the first structure of interest of the entity and the at least one further structure, and information of an account associated with the one or more public sub-keys;

post over a communication network the generated output to a computer based resource; and store the generated output on the blockchain by hashing the generated output, wherein storing the generated output further comprises storing the hashed output in a form of metadata of a blockchain transaction.

* * * * *